(12) United States Patent
Ka et al.

(10) Patent No.: US 11,856,287 B2
(45) Date of Patent: Dec. 26, 2023

(54) COOKING APPARATUS AND CONTROLLING METHOD THEREOF

(71) Applicant: SAMSUNG ELECTRONICS CO., LTD., Suwon-Si (KR)

(72) Inventors: Keehwan Ka, Suwon-si (KR); Seongjoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 17/429,836

(22) PCT Filed: Jul. 7, 2021

(86) PCT No.: PCT/KR2021/008669
§ 371 (c)(1),
(2) Date: Aug. 10, 2021

(87) PCT Pub. No.: WO2022/065641
PCT Pub. Date: Mar. 31, 2022

(65) Prior Publication Data
US 2022/0311927 A1 Sep. 29, 2022

(30) Foreign Application Priority Data
Sep. 25, 2020 (KR) .................. 10-2020-0125099

(51) Int. Cl.
*G06V 20/68* (2022.01)
*H04N 23/66* (2023.01)
(Continued)

(52) U.S. Cl.
CPC .............. *H04N 23/66* (2023.01); *A47J 36/32* (2013.01); *F27D 21/02* (2013.01); *G06T 3/40* (2013.01);
(Continued)

(58) Field of Classification Search
None
See application file for complete search history.

(56) References Cited

U.S. PATENT DOCUMENTS 10,398,260 B2  9/2019 Park et al.
2016/0364613 A1  12/2016 Kuroyama et al.
(Continued)

FOREIGN PATENT DOCUMENTS

CN 109491420 A 3/2019
CN 110806699 A 2/2020
(Continued)

OTHER PUBLICATIONS

International Search Report for International Patent Application No. PCT/KR2021/008669 dated Oct. 18, 2021.
(Continued)

*Primary Examiner* — Eileen M Adams
(74) *Attorney, Agent, or Firm* — STAAS & HALSEY LLP

(57) ABSTRACT

A cooking apparatus including an image capturer and a processor configured to identify a food object from a plurality of images obtained through the image capturer, adjust a capture interval at which an image of the food object is obtained in real time through the image capturer based on information about a cooking state change of the identified food object, and generate a video based on the captured image obtained according to the adjusted capture interval.

15 Claims, 24 Drawing Sheets

(51) Int. Cl.
*G06V 10/44* (2022.01)
*G06V 10/22* (2022.01)
*A47J 36/32* (2006.01)
*F27D 21/02* (2006.01)
*G06T 3/40* (2006.01)
*H04N 5/77* (2006.01)
*H04N 23/62* (2023.01)

(52) U.S. Cl.
CPC ............. *G06V 10/22* (2022.01); *G06V 10/44* (2022.01); *G06V 20/68* (2022.01); *H04N 5/77* (2013.01); *H04N 23/62* (2023.01); *F27D 2021/026* (2013.01)

(56) References Cited

U.S. PATENT DOCUMENTS

| | | | |
|---|---|---|---|
| 2017/0195542 A1* | 7/2017 | Thomas | H04N 23/51 |
| 2017/0261213 A1 | 9/2017 | Park et al. | |
| 2018/0224150 A1* | 8/2018 | Lewis | F25D 29/003 |
| 2018/0324908 A1* | 11/2018 | Denker | H04N 7/188 |
| 2019/0001288 A1 | 1/2019 | Ciepiel et al. | |
| 2019/0200797 A1 | 7/2019 | Diao et al. | |
| 2019/0242584 A1 | 8/2019 | Ebert et al. | |
| 2020/0019861 A1 | 1/2020 | Jeong | |
| 2020/0278117 A1* | 9/2020 | Bhogal | A23L 5/15 |

FOREIGN PATENT DOCUMENTS

| | | |
|---|---|---|
| CN | 111083537 A | 4/2020 |
| CN | 111684368 A | 9/2020 |
| JP | 6427766 | 11/2018 |
| JP | 65998527 | 10/2019 |
| KR | 10-0464075 | 12/2004 |
| KR | 10-2017-0106143 A | 9/2017 |
| KR | 10-2018-0015926 | 2/2018 |
| KR | 10-2019-0105531 A | 9/2019 |
| KR | 20200030955 A | 3/2020 |
| KR | 10-2020-0107829 A | 9/2020 |
| KR | 10-2022-0040228 | 3/2022 |

OTHER PUBLICATIONS

International Written Opinion for International Patent Application No. PCT/KR2021/008669 dated Oct. 18, 2021.
Extended European Search Report dated Oct. 10, 2023 in European Patent Application No. 21872677.6.

* cited by examiner

FIG. 6

| | section 1 | section 2 | section 3 | section 4 |
|---|---|---|---|---|
| | 0-20 MINUTES | 20-25 MINUTES | 25-30 MINUTES | 30-35 MINUTES |
| FOOD OBJECT | | | | |
| COOKING STATE CHANGE AMOUNT | 5% | 15% | 20% | 5% |
| CAPTURE INTERVAL | 20 SECONDS | 5 SECONDS | 1 SECOND | 20 SECONDS |
| NUMBER OF IMAGE FRAMES PER UNIT TIME | 0.05 FRAMES | 0.2 FRAMES | 1 FRAME | 0.05 FRAMES |
| NUMBER OF IMAGE FEATURE INFORMATION | 2 | 8 | 20 | 2 |

COOKING APPARATUS AND CONTROLLING METHOD THEREOF

CROSS-REFERENCE TO RELATED APPLICATIONS

This application is a U.S. National Stage Application, which claims the benefit under 35 U.S.C. § 371 of PCT International Patent Application No. PCT/KR2021/008669, filed Jul. 7, 2021 which claims the foreign priority benefit under 35 U.S.C. § 119 of Korean Patent Application No. 10-2020-0125099, filed Sep. 25, 2020, the contents of which are incorporated herein by reference.

TECHNICAL FIELD

This disclosure relates to a cooking apparatus and a controlling method thereof and, more specifically, to a cooking apparatus for generating a video of cooking food in a cooking apparatus and a controlling method thereof.

BACKGROUND ART

A cooking apparatus may directly record a cooking process of food. If the cooking process is recorded, it is possible to observe how the food is changed during the cooking process, and this may be used for identifying whether an ingredient for food is appropriate and adjusting cooking temperature and heating hours, or the like.

However, observing all of actual cooking time may take a lot of time for a user. For example, when watching a video recorded for a time taken for one hour of cooking process, the user needs to watch the video for one hour or perform an artificial action to give a reproduction time moving command or a fast forward command.

When watching the video by a reproduction time moving command, the user should select an arbitrary time and thus, the user may not select an important recording timing and may skip an important part of the video.

When watching the video by a fast forward command, the user has to watch an unnecessary portion at the same speed, and if the user has to watch the video through fast forward function for a portion with little change, and then watch the video at a normal speed again, the user has to give a separate fast forward cancellation command, making the user feel inconvenient.

Technical Solution

The disclosure provides a cooking apparatus for considering a cooking state change amount in generating a video of a cooking process of food and a controlling method thereof.

According to an embodiment, a cooking apparatus includes an image capturer and a processor configured to identify a food object from a plurality of images obtained through the image capturer, adjust a capture interval (or time interval of capturing) at which an image of the food object is obtained in real time through the image capturer based on information about a cooking state change of the identified food object (or about change of a cooking state corresponding to the identified food object), and generate a video based on the captured image obtained according to the adjusted capture interval.

The information about the cooking state change comprises a cooking state change amount, and the processor is further configured to adjust the capture interval to be inverse-proportional with the cooking state change amount of the food object.

The processor is further configured to, based on the cooking state change amount of the food object being less than a first threshold value, increase the capture interval of the image capturer, and based on the cooking state change amount of the food object being greater than or equal to a second threshold value, decrease the capture interval of the image capturer.

The processor is further configured to analyze the food object using at least one feature information from the plurality of images obtained and adjust a number of the at least one feature information to be proportional with the cooking state change amount of the food object.

The at least one feature information comprises at least one of a contour, an edge, a corner, a histogram, or brightness and the processor is further configured to extract the at least one feature information from the plurality of images obtained, and obtain the food object and the information about the cooking state change of the food object based on the extracted at least one feature information.

The processor is further configured to identify an area of which the cooking state change amount of the food object is greater than or equal to a third threshold value from the plurality of images obtained as a target area and obtain the cooking state change amount of the identified food object based on the identified target area.

The processor is further configured to, based on the cooking state change amount of the food object being greater than or equal to a fourth threshold value, change a resolution of the image obtained from the image capturer.

The cooking apparatus further comprising a memory configured to store food information corresponding to each of a plurality of foods. The processor is further configured to obtain a predicted cooking state change amount of the food object based on the cooking state change amount included in the stored food information and the information about the cooking state change of the food object and change the capture interval of the image capturer based on the predicted cooking state change amount of the food object.

The processor is further configured to obtain the cooking state change amount of the identified food object based on at least one of a size change amount of the food object and a color change amount of the food object and adjust the capture interval of the image based on the obtained cooking state change amount.

The cooking apparatus further comprising a display. The display is controlled to display a guide user interface (UI) for changing the capture interval.

A controlling method of a cooking apparatus according to an embodiment includes obtaining a plurality of images, identifying a food object from a plurality of obtained images, adjusting a capture interval at which an image of the food object is obtained in real time based on information about a cooking state change of the identified food object, and generating a video based on the captured image obtained according to the adjusted capture interval.

The information about the cooking state change comprises a cooking state change amount, and the adjusting the capture interval comprises adjusting the capture interval to be inverse-proportional with the cooking state change amount of the food object.

The adjusting the capture interval comprises based on the cooking state change amount of the food object being less than a first threshold value, increasing the capture interval and based on the cooking state change amount of the food object being greater than or equal to a second threshold value, decreasing the capture interval.

The method further comprising analyzing the food object using at least one feature information from the plurality of images obtained and adjusting the number of the at least one feature information to be proportional with the cooking state change amount of the food object.

The at least one feature information comprises at least one of a contour, an edge, a corner, a histogram, or brightness and the method further comprises extracting the at least one feature information from the plurality of images obtained, and obtaining the food object and the information about the cooking state change of the food object based on the extracted at least one feature information.

DESCRIPTION OF DRAWINGS

The above and other aspects, features, and advantages of certain embodiments of the present disclosure will be more apparent from the following detailed description taken in conjunction with the accompanying drawings, in which:

FIG. 6 is a diagram illustrating cooking state information according to time flow;

MODE FOR CARRYING OUT THE INVENTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through another element (e.g., a third element).

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor (not shown).

In the following description, a "user" may refer to a person using a cooking apparatus or an apparatus using the cooking apparatus (e.g., artificial intelligence electronic apparatus).

Hereinafter, an embodiment will be described in greater detail with reference to the attached drawings.

Figure 1:
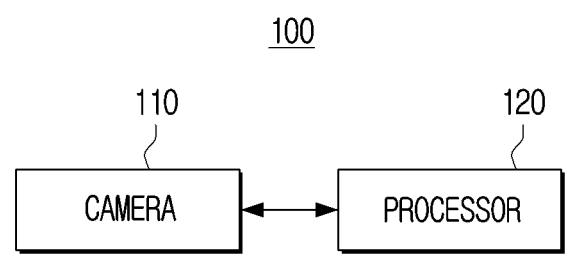
FIG. 1 is a block diagram illustrating a cooking apparatus according to an embodiment.

FIG. 1 is a block diagram illustrating a cooking apparatus according to an embodiment.

Referring to FIG. 1, a cooking apparatus 100 includes an image capturer 110 and a processor 120.

The cooking apparatus 100 may mean a device for cooking food (or cooking object). The cooking apparatus 100 may refer to one of an oven, a microwave oven, an electric range (induction range, an induction cooktop, a highlight), or a food imaging device.

The image capturer 110 is configured to generate a captured image by capturing an object, wherein the captured image includes both a moving image and a still image. The image capturer 110 may obtain an image of at least one external device and may be implemented as a camera, a lens, an infrared sensor, or the like. In addition, the image capturer 110 may be implemented as a video capturing device (or video capturer).

The image capturer 110 may include a lens and an image sensor. The lens type includes a general purpose lens, a wide angle lens, a zoom lens, or the like, and may be determined according to the type, features, usage environment, or the like, of the cooking apparatus 100. A complementary metal oxide semiconductor (CMOS) and a charge coupled device (CCD) may be used as the image sensor.

The image capturer 110 outputs as an image signal corresponding to the light incident thereon. Specifically, the image capturer 110 may include a lens, a pixel, and an analog-to-digital (AD) converter. The lens may collect the light of the object to form an optical image on a captured region, and the pixel may output the light incident through the lens to an analog-type image signal. The AD converter may convert an analog image signal into a digital image signal and output the converted image signal. The image capturer 110 is disposed to capture a front direction of the cooking apparatus 100 and generate a captured image by capturing a user present in the front of the cooking apparatus 100.

The processor 120 may control overall operations of the cooking apparatus 100. The processor 120 may function to control overall operations of the cooking apparatus 100.

The processor 120 may be implemented with a digital signal processor (DSP), a microprocessor, and a time controller (TCON), or the like, but is not limited thereto, and may include at least one of a central processing unit (CPU), a micro controller unit (MCU), a micro processing unit (MPU), a controller, an application processor (AP), a graphics-processing unit (GPU), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type. The processor 120 may perform various functions by executing computer executable instructions stored in a memory.

The processor 120 may identify the food object from the plurality of images obtained through the image capturer 110, control (or adjust) a capture interval of the image obtained in real time through the image capturer 110 based on the information on a cooking state of the identified food object, and generate a video based on the captured image obtained according to the adjusted capture interval.

The processor 120 may control the image capturer 110 to capture a food (or cooking object). An operation of capturing food will be described in detail with reference to FIG. 4.

The processor 120 may identify the food object based on the plurality of images captured using the image capturer 110. An artificial intelligence (AI) model may be stored in the memory 160 of the cooking apparatus 100. The processor 120 may identify the presence of the food object and the type of the food object. For example, the processor 120 may identify whether the food is meat or bread based on the image.

The processor 120 may obtain cooking state change information of the identified food object. The cooking state change information may mean change information of the food state. The cooking state change information of the food object may include a cooking state change amount indicating whether the food has been changed and an amount of change in a cooking state indicating a degree of change of the food.

The processor 120 may adjust the capture interval based on the cooking state change amount. The processor 120 may adjust such that the capture interval is in inverse-proportional with the obtained cooking state change amount of the food object.

The amount of change in the cooking state may be information indicating a degree of change of food. The degree of change of food may include a change amount in color of the food, a change in size, a change in texture, or a change in surface temperature.

According to an embodiment, the image itself may be determined to measure a change in the surface temperature of the food, and according to another embodiment, a separate temperature sensor (not shown) may be used for determination.

The processor 120 may measure the cooking state change amount in real time and if it is identified that the cooking state change amount is small, the processor 120 may increase the capture interval, and if it is identified that the cooking state change amount is large, the processor 120 may reduce the capture interval.

The capture interval may mean a time interval at which the image capturer 110 captures an image. For example, if the image capturer 110 captures the food by 1 piece of image every 1 second, the capture interval may be 1 second, and if the image capturer 110 captures the food by 1 piece every 10 seconds, the capture interval may be 10 seconds.

If the amount of change in the cooking state of the food object is less than a first threshold value, the processor 120 may increase a capture interval of the image capturer 110 and if the obtained cooking state change amount of the food object is greater than or equal to a second threshold value, the processor 120 may reduce the capture interval of the image capturer 110.

A relationship between the cooking state change amount and the capture interval will be described in detail with reference to FIGS. 6 to 8.

The processor 120 may analyze the food object using at least one feature information from a plurality of obtained images, and may adjust the number of the at least one feature information to be proportional to the amount of change in the obtained cooking state of the food object.

The feature information may include at least one of a contour, an edge, a corner, a histogram, or brightness, and the processor 120 may extract feature information from the obtained plurality of images, and obtain the information about the food object and the cooking state change information of the food object based on the extracted feature information.

The feature information may mean a feature point used in an image analysis technology. The processor 120 may analyze an image based on a main feature point in an image to obtain a food object presence, a cooking state of the food object, and a cooking state change amount. Here, the feature points may be variously set according to user settings.

A relationship between the cooking state change amount and the image feature information of an image will be described in detail with reference to FIGS. 6, 11, and 12.

The processor 120 may use a target area in analyzing the food object. The processor 120 may perform an image analysis operation based only on a target area among all areas of the obtained image. When a target area other than all regions is selectively analyzed, the data throughput and the data processing speed may be reduced. The processor 120 may perform a resizing operation for an image with a small size image including only a target area in order to analyze only a target area.

The processor 120 may identify an area in which the amount of change in the cooking state of the food object obtained from the plurality of obtained images is greater than or equal to a third threshold value, as a target area, and may obtain the cooking state change amount of the food object identified based on the identified target area.

The processor 120 may obtain the cooking state change amount based only on the target area and thus may reduce data throughput and data processing time. The target area will be described in greater detail with reference to FIGS. 13 to 15.

The processor 120 may change a resolution of an image based on the cooking state change amount. The processor 120 may adjust the definition of the image to be greater as the cooking state change amount is higher.

If the cooking state change amount of the food object is greater than or equal to a fourth threshold value, the processor 120 may change the definition of the image obtained by the image capturer 110.

When the amount of change in the cooking state is small, the user may not be interested in the corresponding cooking process. Therefore, the definition may be automatically changed to reduce the size of the image. Conversely, if the amount of change in the cooking state is large, the user may be interested in the corresponding cooking process, and thus resolution may be automatically changed to obtain a high definition image.

The operation of changing the resolution will be described in detail with reference to FIG. 16.

A memory 160 for storing food information corresponding to each of the plurality of foods may be further included, and the processor 120 may obtain an expected cooking state change amount of the food object based on the amount of cooking state change included in the stored food information and the amount of change in the cooking state of the food object, and may change the capture interval of the image capturer 110 based on the obtained predicted cooking state change amount of the food object.

The food information corresponding to each of a plurality of foods may refer to information already stored in the memory 160, rather than a value measured by the cooking apparatus 100 itself.

For example, if the food is meat, the stored food information may be stored in the memory 160 based on a general cooking process for the meat. The food information of the meat may include at least one of a cooking time, a cooking temperature, a cooking state of the food according to a cooking time, and a cooking state change according to the quantity of the meat. This is not information measured by directly capturing by the image capturer 110 of the cooking apparatus 100 and may correspond to previously stored basic information In order to distinguish the amount of change of the cooking state obtained from the image captured by the image capturer 110, the amount of change in the cooking state that was already stored may be described as a basic change amount or a basic cooking state change amount, and the amount of cooking state change obtained from the image may be described as a measured cooking state change amount. The food information corresponding to each of the plurality of foods may be a value corresponding to the D_step of FIG. 18.

The processor 120 may obtain a predicted cooking state change amount by considering both a basic cooking state change amount and a measured cooking state change amount. This will be described in detail with reference to FIG. 18.

The processor 120 may obtain a cooking state change amount of the food object identified on the basis of at least one of a change amount in the size of the food object or a change amount in the color cooking state of the food object, and may adjust a capture interval of the image based on the obtained cooking state change amount.

The food may change the food size according to the cooking process (e.g., swelling of bread) and the color of the food may be changed depending on the degree of ripening (e.g., the dough of the bread is changed from white to brown).

The cooking apparatus 100 may further include a display 130, and may control the display 130 to display a guide UI for changing the capture interval.

The processor 120 may display a guide UI guiding the user to select a capture interval. Specifically, the processor 120 may display at least one of the guide UIs 2011 and 2012 displaying a name of a mode with different capture intervals, guide UIs 2111, 2112, and 2113 indicating the degree of adjustment of the capture interval, guide UIs 2211, 2212, and 2213, in which a video generation capacity is displayed, and guide UIs 2311, 2312, and 2313 displaying the video play time, on the display 130.

When the guide UI is displayed, the user may intuitively adjust video recording setting, thereby improving user convenience.

In the above description, the cooking apparatus 100 is described as capturing food by controlling the capture interval, or the like, of the image capturer 110. A final video may be generated by an editing operation after the video is recorded.

According to another embodiment, the cooking apparatus 100 may generate a video by capturing food in a general manner, and the cooking apparatus 100 may directly edit the generated video. The capture interval may mean an interval to extract (obtain) a frame (image) at a specific timing, rather than an interval of capturing by the image capturer.

According to another embodiment, the cooking apparatus 100 may generate a video by capturing food in a general manner. The cooking apparatus 100 may transmit the generated video to an external device through the communication interface 140. The external device may edit the received video. The capture interval may mean an interval to extract (obtain) a frame (image) at a specific point in time other than an interval of capturing by the image capturer. The cooking apparatus 100 may record a cooking process of food, and may edit the video in which the external device is recorded.

An operation of the editing process after the video is recorded will be described with reference to FIGS. 9 and 10.

A finally generated cooking video of the food by adjusting the capture interval, the number of image frames per unit time, the number of image feature information, the definition, and the target area may have different reproduction hours according to the amount of change in the cooking state. Accordingly, more frames including desired parts of the user may be seen, and thus, user satisfaction may be improved. A method for generating or editing a video may improve a data throughput and a data processing speed.

Since the user may intuitively change the video generation or editing method through the various guide UIs, the method for generating or editing the video may increase the convenience of the user.

Although only a simple configuration of the cooking apparatus 100 is shown above, various configurations may be additionally provided during implementation. This will be described below with reference to FIG. 2.

Figure 2:
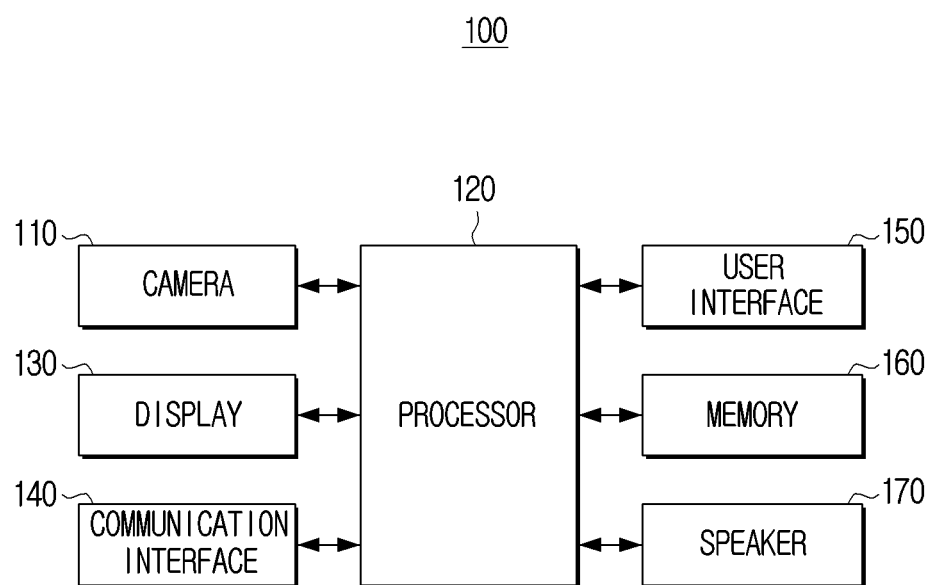
FIG. 2 is a block diagram illustrating a specific configuration of the cooking apparatus of FIG. 1.

FIG. 2 is a block diagram illustrating a specific configuration of the cooking apparatus of FIG. 1.

Referring to FIG. 2, the cooking apparatus 100 may include the image capturer 110, the processor 120, a display 130, a communication interface 140, a user interface 150, a memory 160, and a speaker 170.

The description of same operations as described above among the operations of the image capturer 110 and the processor 120 will be omitted.

The display 130 may be implemented as a display of various types such as a liquid crystal display (LCD), organic light emitting diodes (OLED) display, plasma display panel (PDP), or the like. In the display 130, a backlight unit, a driving circuit which may be implemented as an a-si TFT, low temperature poly silicon (LTPS) TFT, organic TFT (OTFT), or the like, may be included as well. In the meantime, the display 130 may be implemented as a touch screen coupled with a touch sensor, a flexible display, a third-dimensional (3D) display, or the like.

According to an embodiment, the display 130 according to an embodiment may include a display panel for outputting an image and a bezel housing a display panel. According to an embodiment, the bezel may include a touch sensor (not shown) for sensing user interaction.

The communication interface 140 performs communication with various types of external devices according to various types of communication methods. The communication interface 140 may include a Wi-Fi module, a Bluetooth module, an infrared ray communication module, a wireless communication module, or the like. Each communication module may be implemented as at least one hardware chip.

The Wi-Fi module and the Bluetooth module perform communication by the Wi-Fi method and Bluetooth method, respectively. When using the Wi-Fi module or the Bluetooth module, the various connection information such as the service set identifier (SSID) and the session key may be transceived first, and various information may be transceived after communication connection.

The infrared ray communication module performs communication according to infrared data association (IrDA) technology that transmits data wireless to local area using infrared ray between visible rays and millimeter waves.

The wireless communication module may include at least one chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

The communication interface 140 may include at least one of a local area network (LAN) module, Ethernet module, or wired communication module performing communication using a pair cable, a coaxial cable, an optical cable, an ultra-wide band (UWB) module, or the like.

According to an embodiment, the communication interface 140 may use the same communication module (for example, Wi-Fi module) to communicate with an external device such as a remote controller and an external server.

In accordance with another example, the communication interface 140 may utilize different communication modules (for example, Wi-Fi modules) to communicate with an external device such as a remote controller and an external server. For example, the communication interface 140 may use at least one of an Ethernet module or a Wi-Fi module to communicate with an external server, and may use a Bluetooth (BT) module to communicate with an external device such as a remote controller. However, this is merely exemplary, and the communication interface 140 may use at least one communication module among various communication modules when communicating with a plurality of external devices or an external server.

The user interface 150 may be implemented as a button, a touch pad, a mouse, and a keyboard, or may be implemented as a touch screen which may perform the display function and a manipulation input function as well. Here, the button may be various types of buttons such as at least one of a mechanical button, a touch pad, a wheel, or the like, formed in an arbitrary region such as at least one of a front portion, a side portion, a back portion, or the like, of the outer surface of the main body of the cooking apparatus 100.

The memory 160 may be implemented as an internal memory such as a read-only memory (ROM) (for example, electrically erasable programmable read-only memory (EEPROM)) and a random-access memory (RAM) or a memory separate from the processor 120. In this case, the memory 160 may be implemented as at least one of a memory embedded within the cooking apparatus 100 or a memory detachable from the cooking apparatus 100 according to the usage of data storage. For example, the data for driving the cooking apparatus 100 may be stored in the memory embedded within the cooking apparatus 100, and the data for upscaling of the cooking apparatus 100 may be stored in the memory detachable from the cooking apparatus 100.

A memory embedded in the cooking apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the cooking apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The cooking apparatus 100 may include a speaker 170. The speaker (170) may be an element to output various audio data, various alarm sounds, a voice message, or the like, which are processed by an input and output interface.

The cooking apparatus 100 may further include a microphone (not shown). The microphone is an element to receive a user voice or other sound and convert to audio data.

The microphone (not shown) may receive the user voice in an active state. For example, the microphone may be integrally formed as an integral unit on at least one of an upper side, a front side direction, a side direction, or the like of the cooking apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

Figure 3:
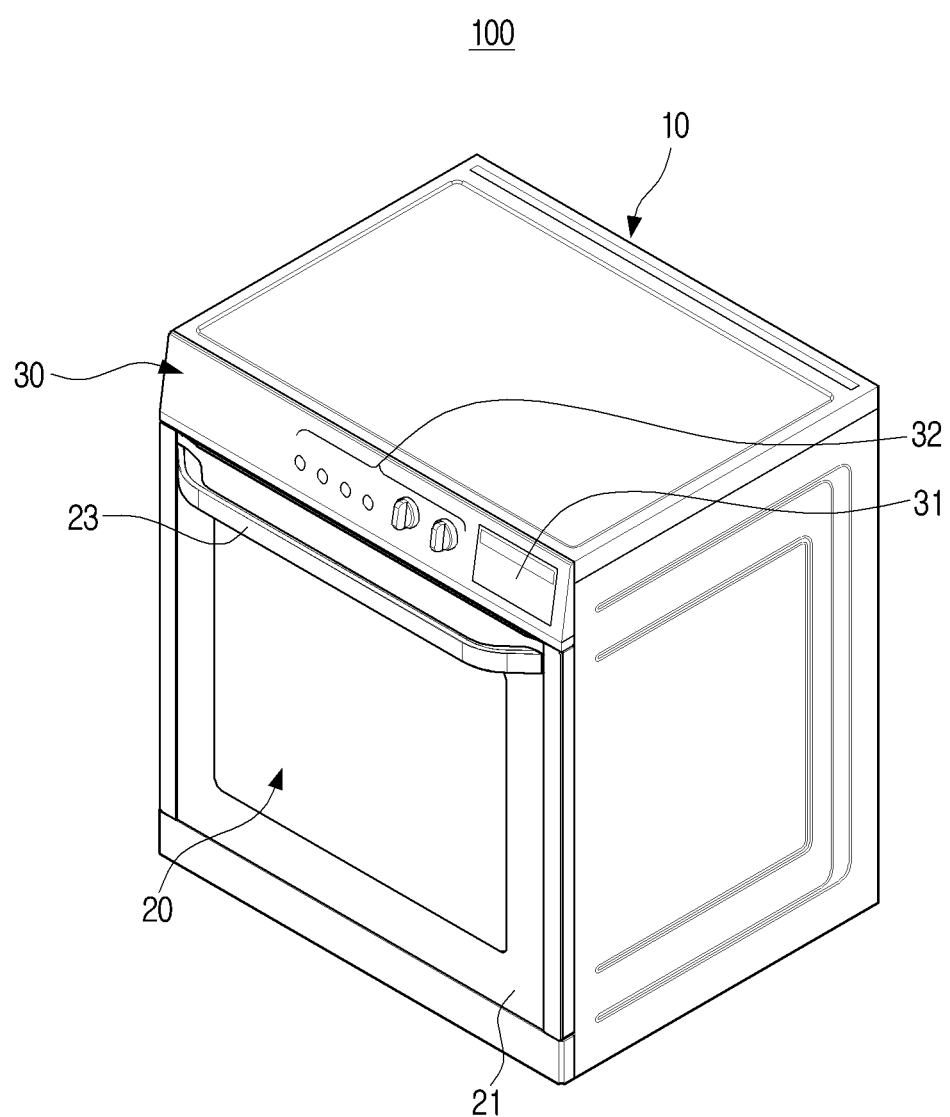
FIG. 3 is a perspective view illustrating a specific configuration of the cooking apparatus of FIG. 1.

FIG. 3 is a perspective view illustrating a specific configuration of the cooking apparatus of FIG. 1.

Referring to FIG. 3, the cooking apparatus 100 is merely exemplary, and the cooking apparatus may be implemented in various formats according to various embodiments.

As illustrated in FIG. 3, the cooking apparatus 100 may include a main body 10 forming an outer appearance.

The cooking apparatus 100 also includes a cooking chamber 20 opened toward one side thereof. The cooking chamber 20 may mean a space for accommodating food (i.e., an accommodating space). The cooking chamber 20 of the main body 10 may be the cooking chamber 20 where cooking object (i.e., food) is cooked, and the cooking chamber 20 may be opened toward the front of the cooking apparatus 100.

The cooking chamber 20 is formed in a box shape and a front portion thereof is opened to take out or insert the cooking object. The front portion of the main body 10 may include an opening connected to the cooking chamber 20.

The front surface of the cooking chamber 20 may be opened and closed by a door 21 connected to the main body 10. The door 21 may be hinge-coupled to a lower portion of the main body 10 so as to be rotatable with respect to the main body 10. A door handle 23, which may be gripped by a user, may be provided on the front surface of the door 21, and the user may grip the door handle 23 to open and close the cooking chamber 20.

The cooking chamber 20 may include a heater for heating the cooking object. In this case, the heater may be an electric heater including an electrical resistor. The heater may not be limited to an electric heater and may be a gas heater that generates heat by burning gas.

A control panel 30 may be disposed on an upper portion of the main body 10. The control panel 30 may include a display 31 for displaying various operation information of the cooking apparatus 100 and receiving a user command for controlling the operation of the cooking apparatus 100. The control panel 30 may include a button 32 for receiving various user commands for controlling the operation of the cooking apparatus 100.

According to an embodiment, the cooking apparatus 100 may perform cooking of the cooking object in consideration of the size and cooking state of the cooking object inserted into the cooking chamber.

The cooking apparatus 100 may determine a cooking time for the cooking object according to the type of the cooking object selected through the control panel 30. The cooking apparatus 100 may identify the size of the cooking object and determine the cooking time according to the identified size. For example, even for the same type cooking object, the smaller the size of the cooking object, the cooking time may be determined to be relatively short, and the longer the size of the cooking object, the cooking time may be determined to be relatively long.

The cooking apparatus 100 may identify the cooking state of the cooking object while cooking is performed, and may control processing of cooking based on the cooking state.

If it is identified that cooking of the cooking object is completed according to the degree of ripeness of cooking object, the cooking apparatus 100 may terminate the cooking even before the set cooking time ends. For example, the cooking apparatus 100 may identify the degree of ripeness of the cooking object, and if the cooking apparatus 100 identifies that cooking is completed for the cooking object according to the degree of ripeness, the cooking apparatus 100 may terminate the cooking even before the cooking time ends.

As described above, according to various embodiments of, rather than determining the cooking time in consideration of the type of food only, but even for the same type of cooking object, different cooking times may be determined depending on the size of the cooking object, and the time at which the cooking is terminated may be determined according to the cooking state of the food while the cooking is performed. Accordingly, even if the user does not know an accurate cooking method due to the difference of the size of the cooking object, when the user selects a type of the cooking object to be cooked, the user may optimally cook the cooking object without monitoring the cooking process.

Figure 4:
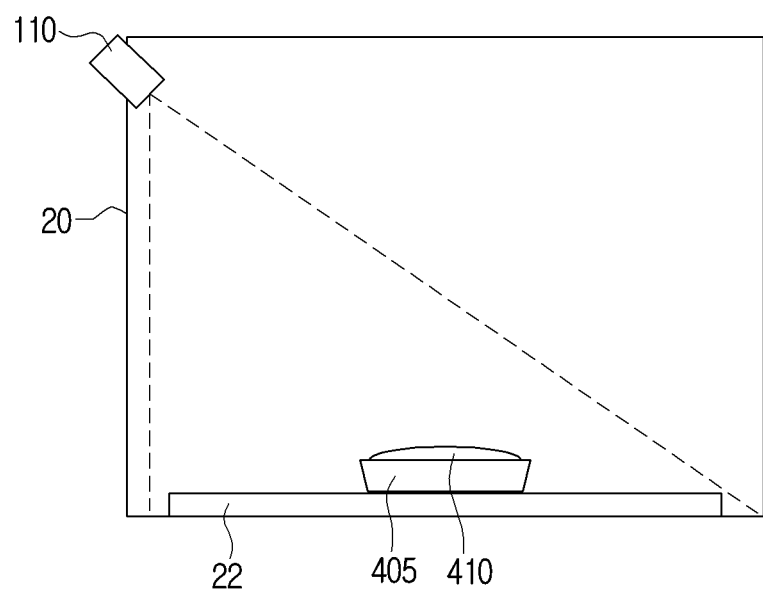
FIG. 4 is a diagram illustrating an internal configuration of a cooking chamber for cooking food.

FIG. 4 is a diagram illustrating an internal configuration of a cooking chamber for cooking food.

Referring to FIG. 4, food 410 may be present in the cooking chamber 20 of the cooking apparatus 100.

The food 410 may be in a container 405, and the container 405 may be placed on a base plate 22. The image capturer 110 of the cooking apparatus 100 may capture at least one of the base plate 22, the container 405, or the food 410.

A field of view may be different depending on the type of the image capturer 110, but the image capturer 110 may be arranged to capture all the entire area inside the cooking chamber 20.

According to an embodiment, as shown in FIG. 4, the image capturer 110 may be attached to a wall surface of the cooking chamber 20 and may be disposed to be inclined downward with respect to a predetermined angle. For example, the image capturer 110 may be disposed at an inclined state of 45 degrees downward in a state of being attached to a wall surface of the cooking chamber 20.

According to another embodiment, the image capturer 110 may be attached to an upper plate (or ceiling) of the cooking chamber 20 and may be disposed downward with respect to a predetermined angle. For example, the image capturer 110 may be disposed downward while being attached to the upper plate of the cooking chamber 20.

While the image capturer 110 of FIG. 4 is shown in a protruding form, the image capturer 110 of FIG. 4 may be implemented in a form of being disposed on a wall of the cooking chamber 20 or inside an upper plate of the cooking chamber 20 in order to protect the image capturer lens during an actual implementation.

Figure 5:
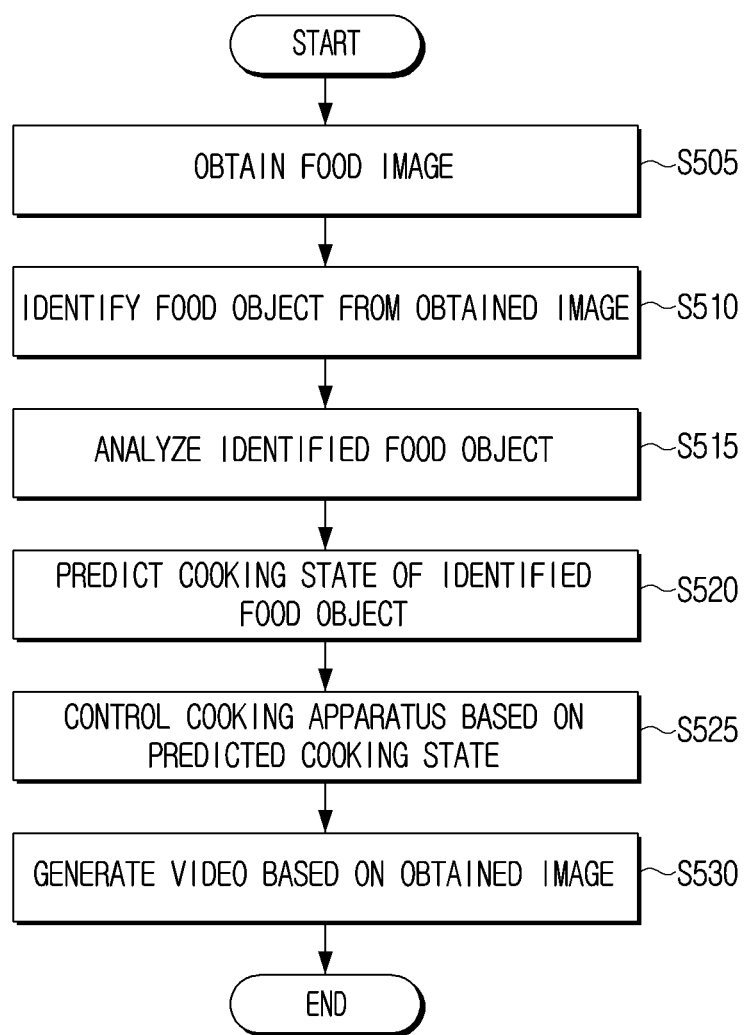
FIG. 5 is a flowchart illustrating a method of generating a video for food according to an embodiment.

FIG. 5 is a flowchart illustrating a method of generating a video for food according to an embodiment.

Referring to FIG. 5, the cooking apparatus 100 may obtain an image including food in operation S505. The cooking apparatus 100 may identify the food object in the obtained image in operation S510. The cooking apparatus 100 may analyze the identified food object in operation S515. The operation of analyzing the food object may mean analyzing the cooking state of the food object. The cooking apparatus 100 may predict the cooking state of the identified food object as a result of the analysis in operation S520. The cooking apparatus 100 may control the cooking apparatus 100 based on the predicted cooking state. Here, controlling the cooking apparatus 100 may mean controlling various hardware or software included in the cooking apparatus 100. For example, the cooking apparatus 100 may adjust the heating temperature and the heating time based on the predicted cooking state. The cooking apparatus 100 may control the image capturer 110 based on the predicted cooking state. The cooking apparatus 100 may perform video editing based on the predicted cooking state.

The cooking apparatus 100 may obtain a plurality of images based on the aforementioned operation, and may generate a video based on the obtained plurality of images in operation S530.

FIG. 6 is a diagram illustrating cooking state information according to time flow.

Referring to FIG. 6, a table 605 includes information about the cooking process of food. Specifically, assuming that food is bread, and the cooking time is 35 minutes. The cooking process may be divided into four sections. The four sections may be arbitrarily divided and may vary depending on the food or cooking method.

The time of the first section in the cooking process of the bread may be 20 minutes (0 to 20 minutes from the total cooking time) and the amount of change in the cooking state may be 5%. The cooking apparatus 100 may set the capture interval to 20 seconds based on the amount of change in the cooking state in the first section. The cooking apparatus 100 may set the number of image frames per unit time to 0.05. The unit time of table 605 corresponds to 1 second and may vary depending on the actual implementation example. The cooking apparatus 100 may set the number of image feature information to two.

In the cooking process of the bread, the time of the second section may be 5 minutes (20 minutes to 25 minutes in the total cooking time), and the amount of change in the cooking state may be 15%. The cooking apparatus 100 may set the capture interval to 5 seconds based on the amount of change in the cooking state in the second section. The cooking apparatus 100 may set the number of image frames per unit time to be 0.2. The unit time of table 605 corresponds to 1 second and may vary depending on the actual implementation example. The cooking apparatus 100 may set the number of image feature information to eight.

During the cooking process of the bread, the time of a third section may be 5 minutes (25 minutes to 30 minutes from the total cooking time), and the amount of change in the cooking state may be 20%. The cooking apparatus 100 may set the capture interval to 1 second based on the amount of change in the cooking state in the third section. The cooking apparatus 100 may set the number of image frames per unit time to one. The unit time of table 605 corresponds to 1 second and may vary depending on the actual implementation example. The cooking apparatus 100 may set the number of image feature information to 20.

During the cooking process of the bread, the time of a fourth section may be 5 minutes (30 minutes to 35 minutes from the total cooking time), and the amount of change in the cooking state may be 5%. The cooking apparatus 100 may set the capture interval to 20 seconds based on the amount of change in the cooking state in the fourth section. The cooking apparatus 100 may set the number of image frames per unit time to 0.05. The unit time of the table 605 corresponds to 1 second and may vary depending on the actual implementation example. The cooking apparatus 100 may set the number of image feature information to two.

Referring to the first to fourth sections, in the cooking process of the bread, a change amount in first 20 minutes may be small, but the change amount may increase for about 10 minutes. The change amount may be reduced for the bread after 30 minutes, and finally the cooking process may be completed.

The cooking apparatus 100 may control the capture interval based on the amount of change in the cooking state. According to the data of table 605, the capture interval and the number of image frames per unit time may mean the same information. According to another embodiment (embodiment different from FIG. 6), the number of capture intervals and the number of image frames per unit time may not correspond to each other. For example, the cooking apparatus 100 may selectively obtain a plurality of images used for generating a video based on the number of image frames per unit time after obtaining the image based on the capture interval. After obtaining 100 images based on the capture interval, the cooking apparatus 100 may selectively obtain 80 pieces of images based on the number of image frames per unit time. The cooking apparatus 100 may generate a video based on the 80 images.

The cooking apparatus 100 may control the number of cooking state image feature information. The cooking apparatus 100 may identify or analyze a food object using more image feature information in a section having a large amount of change. The detailed description related thereto will be described later with reference to FIG. 11.

Figure 7:
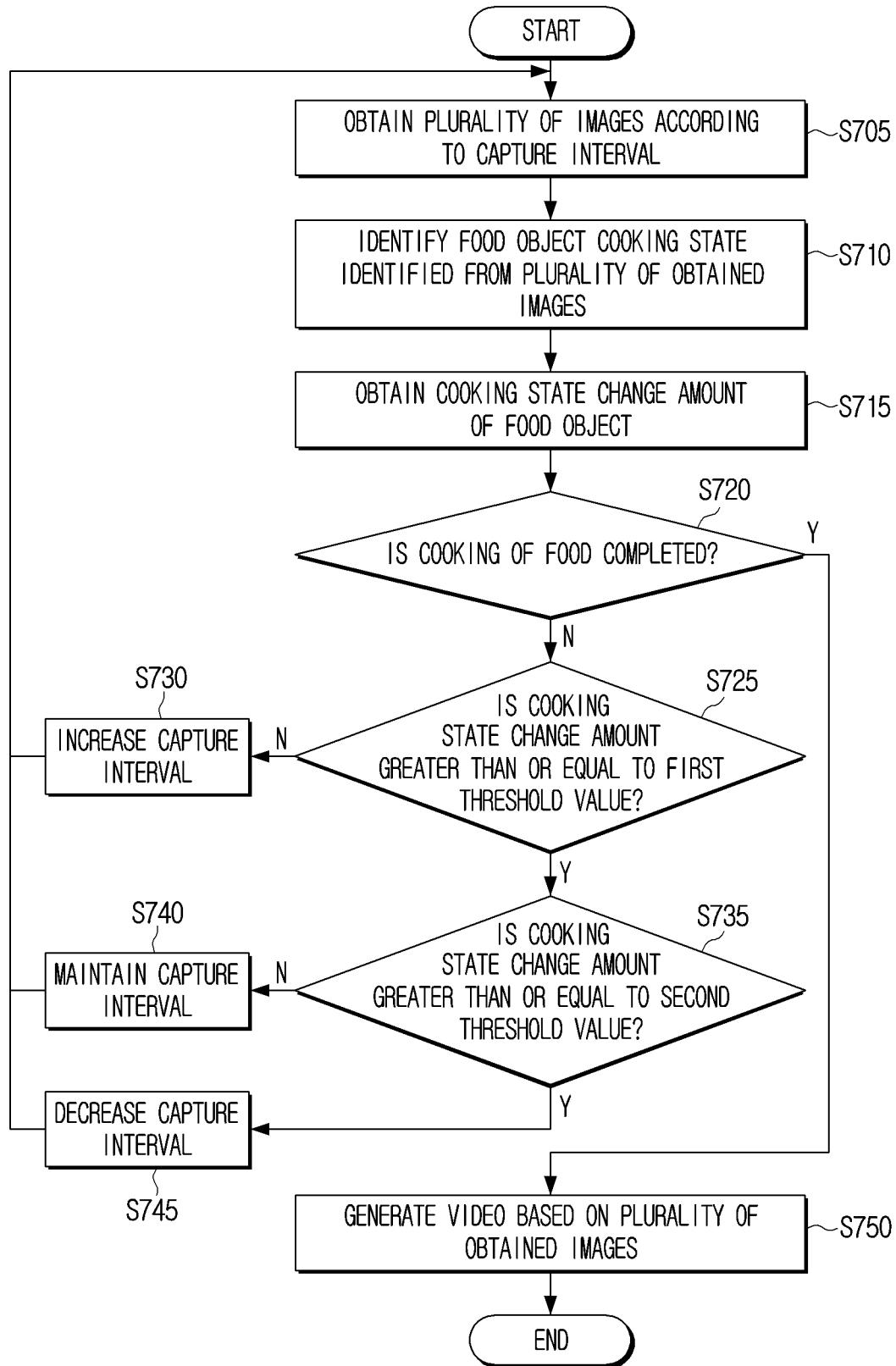
FIG. 7 is a flowchart illustrating an operation of a cooking apparatus for controlling a capture interval.

FIG. 7 is a flowchart illustrating an operation of a cooking apparatus for controlling a capture interval.

Referring to FIG. 7, the cooking apparatus 100 may obtain a plurality of images according to a capture interval in operation S705. The cooking apparatus 100 may identify a food object from the plurality of obtained images and identify a cooking state of the identified food object in operation S710. The cooking apparatus 100 may obtain a cooking state change amount of the food object based on a cooking state of the food object corresponding to each of the plurality of images in operation S715.

In operation S720, the cooking apparatus 100 may identify whether the cooking of the food is completed in operation S720. Whether the cooking of the food is completed may be identified by various methods. For example, the cooking apparatus 100 may identify whether cooking is completed based on the amount of change in the cooking state of the food. For example, in the initial cooking process according to the cooking process, the amount of change in the cooking state may be 0% and the amount of change in the cooking state may be increased. Finally, the amount of change in the cooking state may be reduced to 0% again. The cooking apparatus 100 may identify whether cooking is completed on the basis of the time when the amount of change in the cooking state rises from 0% to a specific value and then becomes 0% again. As another example, the cooking apparatus 100 may identify whether cooking is completed based on a cooking setting time. For example, the cooking setting time of the cooking apparatus 100 may be predetermined. A cooking time may be set based on a mode which is selected by a user or by directly setting a cooking time by a user.

If it is identified that cooking of the product is completed, the cooking apparatus 100 may generate a video based on the obtained plurality of images in operation S750.

If it is identified that the cooking of the food is not completed, the cooking apparatus 100 may identify whether the cooking state change amount is greater than or equal to the first threshold value in operation S725. If the amount of change in the cooking state is less than the first threshold value, the cooking apparatus 100 may increase the capture interval in operation S730. The cooking apparatus 100 may obtain a plurality of images based on the increased capture interval.

If the amount of change in the cooking state is greater than or equal to the first threshold value, the cooking apparatus 100 may identify whether the cooking state change amount is greater than or equal to the second threshold value in operation S735. If the amount of change in the cooking state is less than the second threshold value, the cooking apparatus 100 may maintain the previously established capture interval in operation S740. The cooking apparatus 100 may obtain a plurality of images based on the maintained capture interval.

If the amount of change in the cooking state is greater than or equal to the second threshold value, the cooking apparatus 100 may reduce the capture interval in operation S745. The cooking apparatus 100 may obtain a plurality of images based on the reduced capture interval.

After performing operations S730, S740, and S745, the cooking apparatus 100 may obtain an image based on increased, maintained, or reduced capture interval, and may repeat operations S705 to S720. If it is identified that the cooking of the food is completed, the cooking apparatus 100 may generate a video based on the plurality of obtained images in operation S750.

Figure 8:
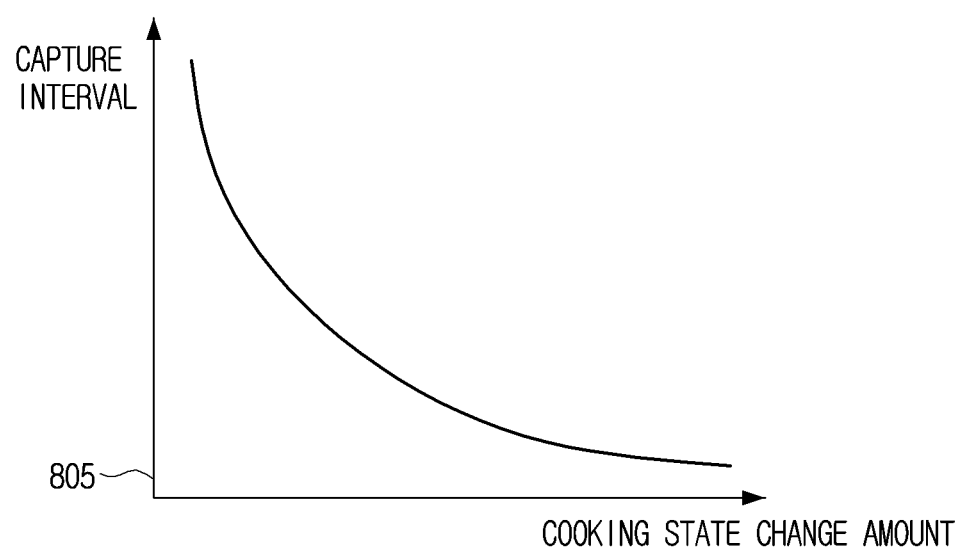
FIG. 8 is a diagram illustrating a relationship between a capture interval and a cooking state change amount in the control operation of FIG. 7.

FIG. 8 is a diagram illustrating a relationship between a capture interval and a cooking state change amount in the control operation of FIG. 7.

Referring to FIG. 8, the cooking apparatus 100 may control the capture interval so that the cooking state change amount and the capture interval are inversely proportional to each other. The smaller the cooking state change amount, the cooking apparatus 100 may increase the capture interval, and the larger the cooking state change amount, the cooking apparatus 100 may decrease the capture interval.

The reason why the cooking state change amount and the capture interval are inversely proportional is because there is no need to obtain a large amount of image when the amount of change in the cooking state is small. The image desired by the user may be an image that has a change, not an image without change. Since the number of images without a change may be decreased, and the number of images with a lot of change is increased, a finally generated video may include desired images a lot more.

Figure 9:
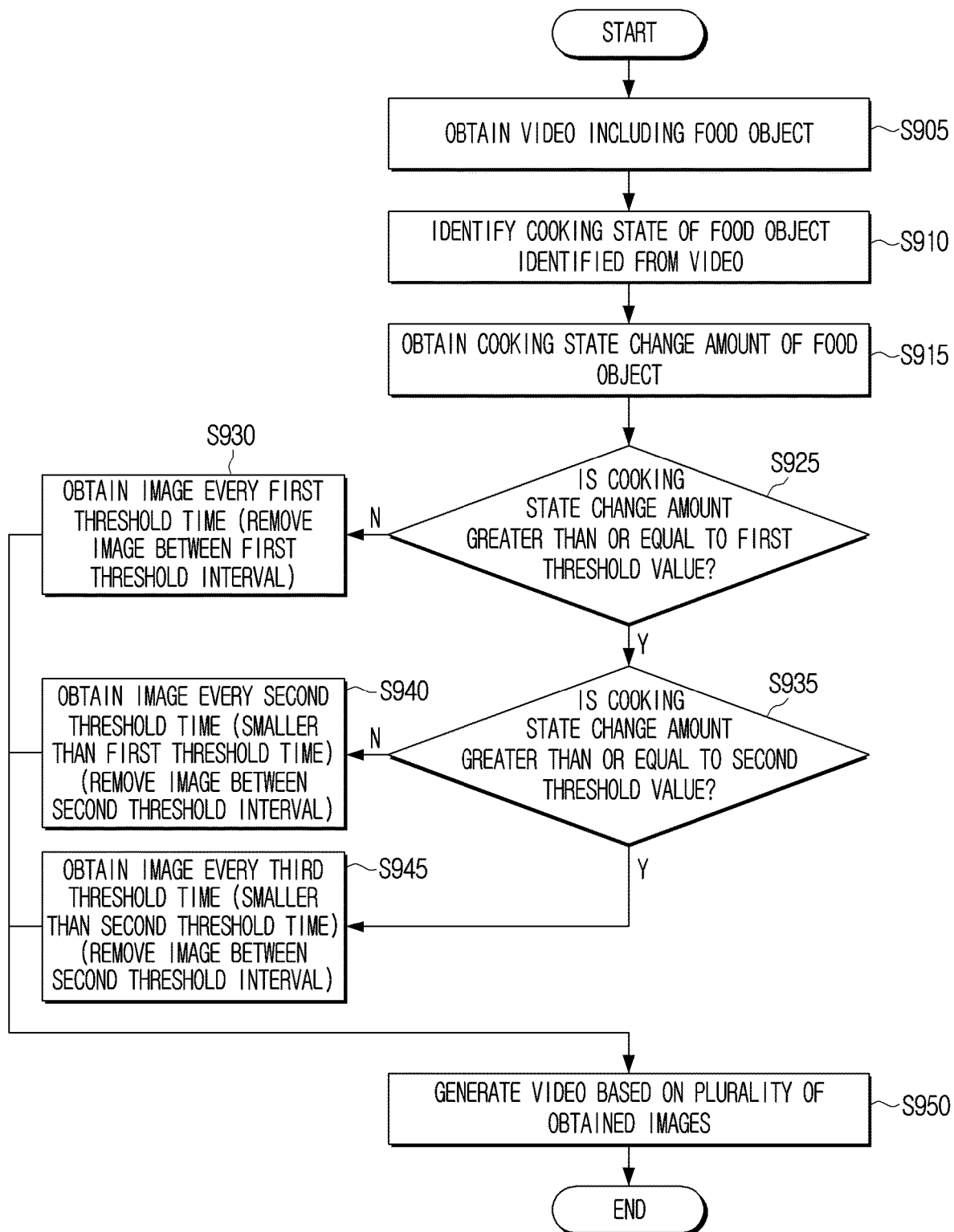
FIG. 9 is a flowchart illustrating an operation of controlling a threshold for obtaining an image.

FIG. 9 is a flowchart illustrating an operation of controlling a threshold for obtaining an image.

Referring to FIG. 9, the cooking apparatus 100 may obtain a video including the food object in operation S905. The cooking apparatus 100 may obtain an unedited video. For example, the unedited video may refer to a video obtained by capturing by the image capturer 110. For example, if the capture interval of the image capturer 110 is not adjusted, the video may be a video composed of an image obtained at regular intervals.

As another example, if the capture interval of the image capturer 110 is adjusted, the video may refer to a video formed of an image of which capture interval is adjusted. The cooking apparatus 100 may additionally edit the video after the capture interval has been already adjusted.

In operation S910, the cooking apparatus 100 may identify a cooking state of the food object identified in the obtained video. The cooking apparatus 100 may analyze each of the plurality of images constituting the video to identify (or analyze) the cooking state of the food object.

In operation S915, the cooking apparatus 100 may obtain a cooking state change amount of the food object based on the cooking state of the food object obtained in operation S910. The amount of change in the cooking state may mean the amount of change corresponding to the feature frame. For example, the amount of change in the cooking state of frame 1 and the amount of change in the cooking state of frame 2 and the amount of change in the cooking state of the frame 60 in the video may be obtained. The cooking apparatus 100 may obtain a cooking state change amount for each of the frames included in the video.

The cooking apparatus 100 may identify whether the amount of change in the cooking state of the specific frame is greater than or equal to the first threshold value in operation S925. If the amount of change in the cooking state is less than the first threshold value, the cooking apparatus 100 may obtain an image at every first threshold time in operation S930. The cooking apparatus 100 may identify a frame of which the cooking state change amount is less than a first threshold value among all frames included in the video. The cooking apparatus 100 may obtain a frame (image) every first threshold time in a frame that a cooking state change amount is less than a first threshold value. The cooking apparatus 100 may remove (or delete or skip) the frame (image) corresponding to the first threshold interval from a frame that a cooking state change amount is less than the first threshold.

For example, assume that the frame in which the cooking state change amount is less than the first threshold is 100 (corresponding to 100 seconds) and the first threshold time is 20 seconds. The cooking apparatus 100 may obtain (or extract or select) only five frames among 100 frames corresponding to 100 seconds. Finally, the cooking apparatus 100 may allocate five frames to a region corresponding to 100 seconds.

If the amount of change in the cooking state of the specific frame is greater than or equal to the first threshold value, the cooking apparatus 100 may identify whether the cooking state change amount is greater than or equal to the second threshold value in operation S935. If the amount of change in the cooking state is less than the second threshold, the cooking apparatus 100 may obtain an image every second threshold time. The second threshold time may be less than the first threshold time. The cooking apparatus 100 may identify a frame having a cooking state change amount greater than or equal to a first threshold value and less than a second threshold value among all frames included in the video. The cooking apparatus 100 may obtain a frame (image) every second threshold time in a frame that is greater than or equal to the first threshold value and is less than the second threshold. The cooking apparatus 100 may remove (or delete or skip) a frame (image) corresponding to a second threshold interval among the frame that is greater than or equal to the first threshold value and less than the second threshold value.

If the amount of change in the cooking state of the particular frame is greater than or equal to the second threshold value, the cooking apparatus 100 may obtain an image every third threshold time in operation S945. The third threshold time may be less than the second threshold time. The time size may be smaller in the order of the first threshold time, the second threshold time, and the third threshold time. Specifically, the cooking apparatus 100 may identify a frame having a cooking state change amount greater than or equal to a second threshold value among all frames included in the video. The cooking apparatus 100 may obtain a frame (image) every third threshold time in a frame having a second threshold value or higher. The cooking apparatus 100 may remove (or delete or skip) the frame (image) corresponding to the third threshold interval among the frame that is greater than or equal to the second threshold.

Operations S930, S940, and S945 may be performed in consecutive frames. Since the video should be generated according to the time order rather than the cooking state change, the operation of obtaining an image (or extracting or selecting) may also be performed in a consecutive frame. In operation S950, the cooking apparatus 100 may generate a video based on a plurality of images obtained in operations S930, S940, and S945.

Figure 10:
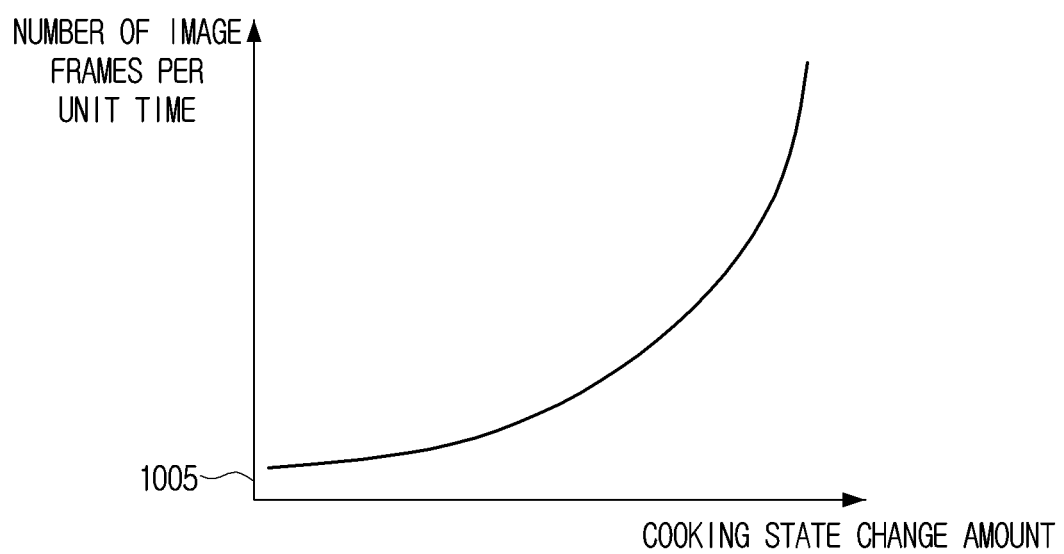
FIG. 10 is a diagram illustrating a relationship between the number of image frames per unit time and the cooking state change amount in the control operation.

FIG. 10 is a diagram illustrating a relationship between the number of image frames per unit time and the cooking state change amount in the control operation.

Referring to FIG. 10, the number of image frames per unit time and the amount of change in the cooking state may be proportional to each other. Specifically, the cooking apparatus 100 may reduce the number of image frames per unit time as the amount of change in the cooking state is smaller. In order to reduce the number of image frames per unit time, the cooking apparatus 100 may increase a threshold time for obtaining an image in a video.

The cooking apparatus 100 may increase the number of image frames per unit time as the amount of change in the cooking state is greater. In order to increase the number of image frames per unit time, the cooking apparatus 100 may reduce a threshold time for obtaining an image from a video.

The greater the amount of change in the cooking state is, the image may be an image desired by the user. The cooking apparatus 100 may obtain more images in a frame in which the amount of change in the cooking state is large in the video, and may obtain a smaller image in a section where the amount of change in the cooking state is smaller, thereby generating a video. In the original video, a video of a summary version including more of desired images may be newly generated.

Figure 11:
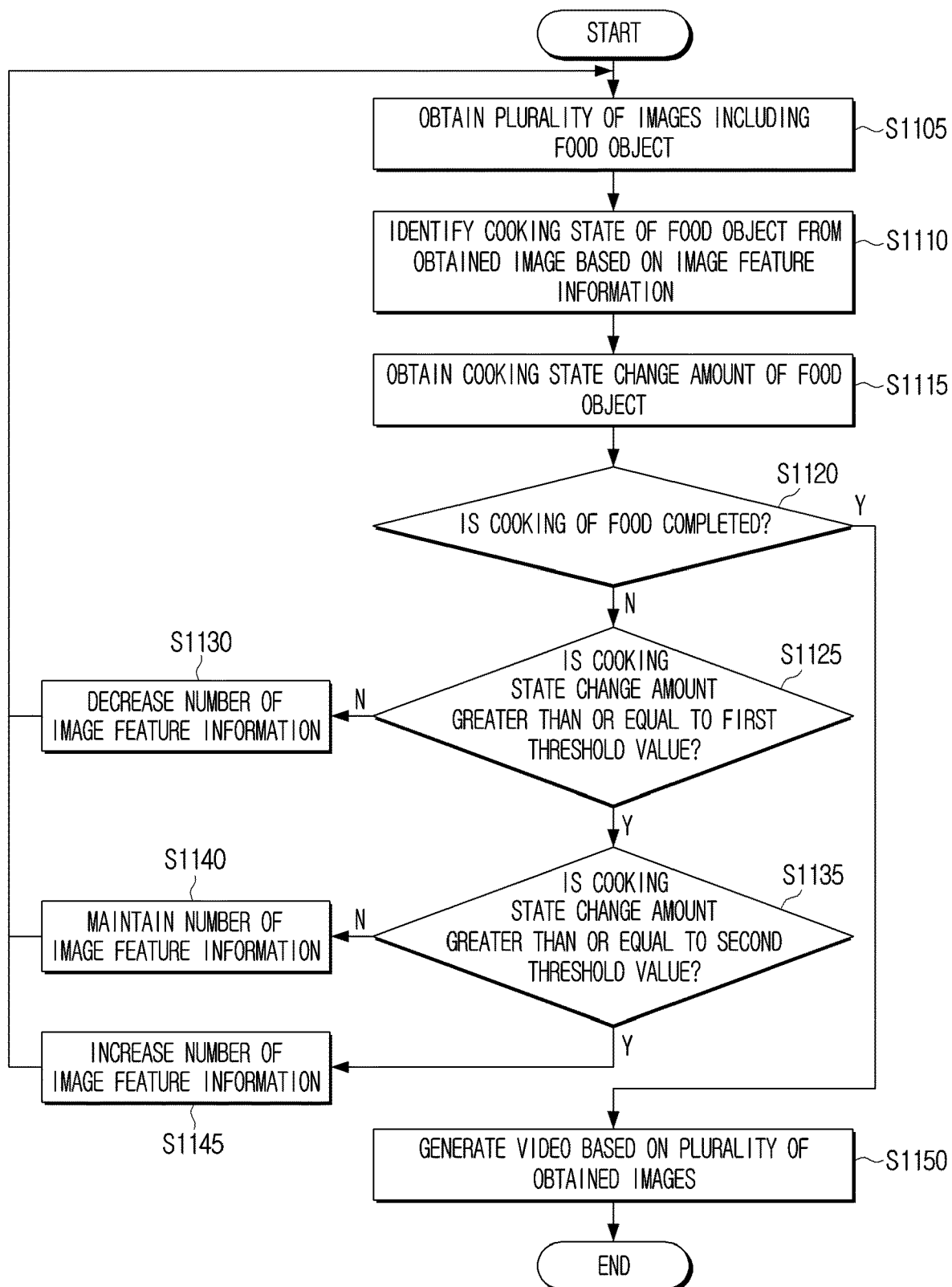
FIG. 11 is a diagram illustrating an operation of controlling the number of image feature information.

FIG. 11 is a diagram illustrating an operation of controlling the number of image feature information.

Referring to FIG. 11, the cooking apparatus 100 may obtain a plurality of images including food objects in operation S1105. Further, the cooking apparatus 100 may identify the cooking state of the food object based on the image feature information in the obtained image in operation S1110. The cooking apparatus 100 may obtain the amount of change in the cooking state of the food object in operation S1115. The cooking apparatus 100 may identify whether the cooking of the food is completed in operation S1120. The operation S1120 may correspond to operation S720, and thus a duplicate description will be omitted.

If it is identified that cooking of the food object is completed, the cooking apparatus 100 may generate a video based on the plurality of obtained images in operation S1150.

If it is identified that the cooking of the food is not completed, the cooking apparatus 100 may identify whether the cooking state change amount is greater than or equal to the first threshold value in operation S1125. If the amount of change in the cooking state is less than the first threshold value, the cooking apparatus 100 may reduce the number of image feature information in operation S1130. The cooking apparatus 100 may obtain a plurality of images based on the reduced image feature information.

If the amount of change in the cooking state is greater than or equal to the first threshold value, the cooking apparatus 100 may identify whether the cooking state change amount is greater than or equal to the second threshold value in operation S1135. If the amount of change in the cooking state is less than the second threshold value, the cooking apparatus 100 may maintain the number of preset image feature information in operation S1140. The cooking apparatus 100 may obtain a plurality of images based on the maintained image feature information.

If the amount of change in the cooking state is equal to or greater than the second threshold value, the cooking apparatus 100 may increase the number of image feature information in operation S1145. The cooking apparatus 100 may obtain a plurality of images based on the increased image feature information.

After performing the operations S1130, S1140, and S1145, the cooking apparatus 100 may obtain an image based on the reduced, maintained, or increased image feature information, and may repeat operations S1105 to S1120. If it is identified that cooking of the food is completed, the cooking apparatus 100 may generate a video based on the plurality of obtained images in operation S1150.

Figure 12:
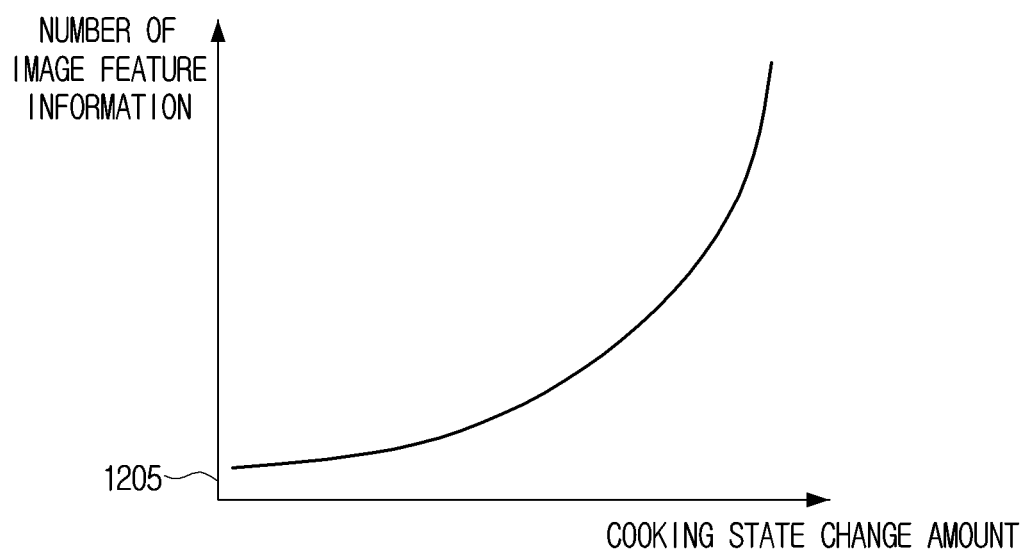
FIG. 12 is a diagram illustrating a relationship between the number of image feature information and the cooking state change amount in the control operation of FIG. 11.

FIG. 12 is a diagram illustrating a relationship between the number of image feature information and the cooking state change amount in the control operation of FIG. 11.

Referring to FIG. 12, the cooking apparatus 100 may control the number of image feature information so that the amount of change of the cooking state and the number of image feature information are proportional. The cooking apparatus 100 may reduce the number of image feature information as the amount of change in the cooking state is smaller, and may increase the number of image feature information as the amount of change in the cooking state is larger.

That the number of image feature information is small may mean applying a minimum criterion to analyze the image. That the number of image feature information is large may mean increasing the number of image recognition rate. Accordingly, the cooking apparatus 100 may perform image analysis based on more image feature information in a period where the amount of change in the cooking state is high. Since the analysis with high recognition rate is performed only in a period where the change of the cooking state is high rather than all periods, so the overall data processing time may be reduced.

Figure 13:
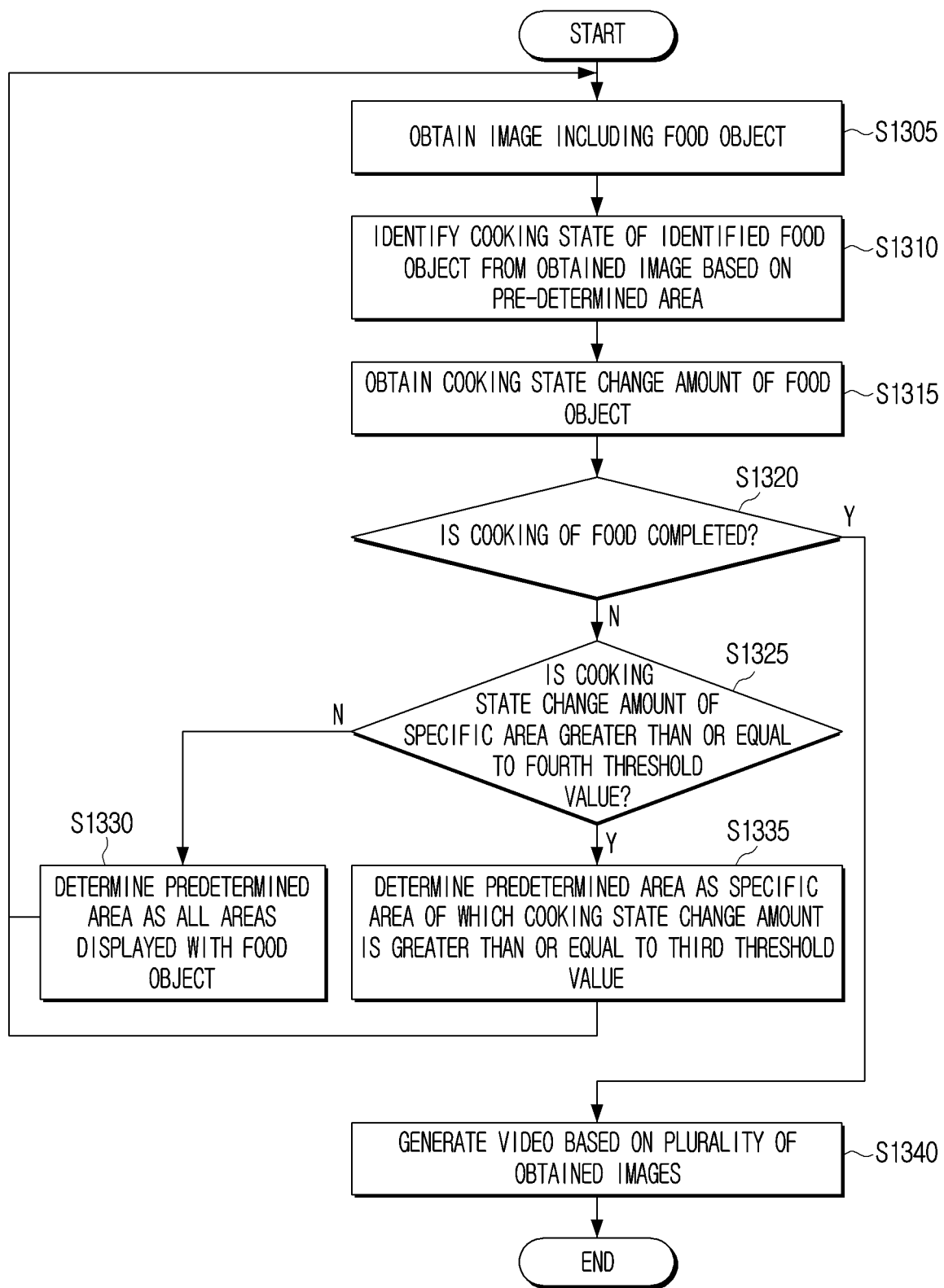
FIG. 13 is a flowchart illustrating an operation of controlling a preset region of identifying a cooking state of a food object.

FIG. 13 is a flowchart illustrating an operation of controlling a preset region of identifying a cooking state of a food object.

Referring to FIG. 13, the cooking apparatus 100 may obtain an image including a food object in operation S1305. The cooking apparatus 100 may identify the cooking state of the food object identified based on the predetermined region in the obtained image in operation S1310. The predetermined region (or target area) may refer to a specific area of the cooking chamber 20 that may be captured by the image capturer 110. The cooking apparatus 100 may obtain a cooking state change amount of the food object in operation S1315. The cooking apparatus 100 may identify whether the cooking of food is completed in operation S1320. The operation S1320 may be corresponding to operation S720 and duplicate description will be omitted.

When the cooking of the food is identified as being completed, the cooking apparatus 100 may generate a video based on the plurality of obtained images in operation S1350.

When the cooking of food is identified as incomplete, the cooking apparatus 100 may identify whether the cooking state change amount is greater or equal to the third threshold in operation S1325. If the cooking state change amount is less than the third threshold value, the cooking apparatus 100 may determine the predetermined area to be all areas where the food object is displayed in operation S1330. The cooking apparatus 100 may identify the cooking state of the food object based on all areas where the food object is displayed.

If the amount of change in the cooking state is greater than or equal to the third threshold value, the cooking apparatus 100 may determine that the predetermined area is the area having the cooking state change amount greater than or equal to the third threshold value in operation S1335. The cooking state of the food object may be identified based on a region in which the amount of change in the cooking state is greater than or equal to a third threshold value.

The cooking apparatus 100 may identify the cooking state of the food object based on the predetermined area determined according to operations S1330 and S1335 and may repeat S1305 to S1320. If it is identified that the cooking of food is completed, the cooking apparatus 100 may generate a video based on a plurality of obtained images obtained in operation S1350.

In order to analyze only the predetermined area (or target area) in the embodiment of FIG. 13, the cooking apparatus 100 may perform an image resizing operation.

Figure 14:
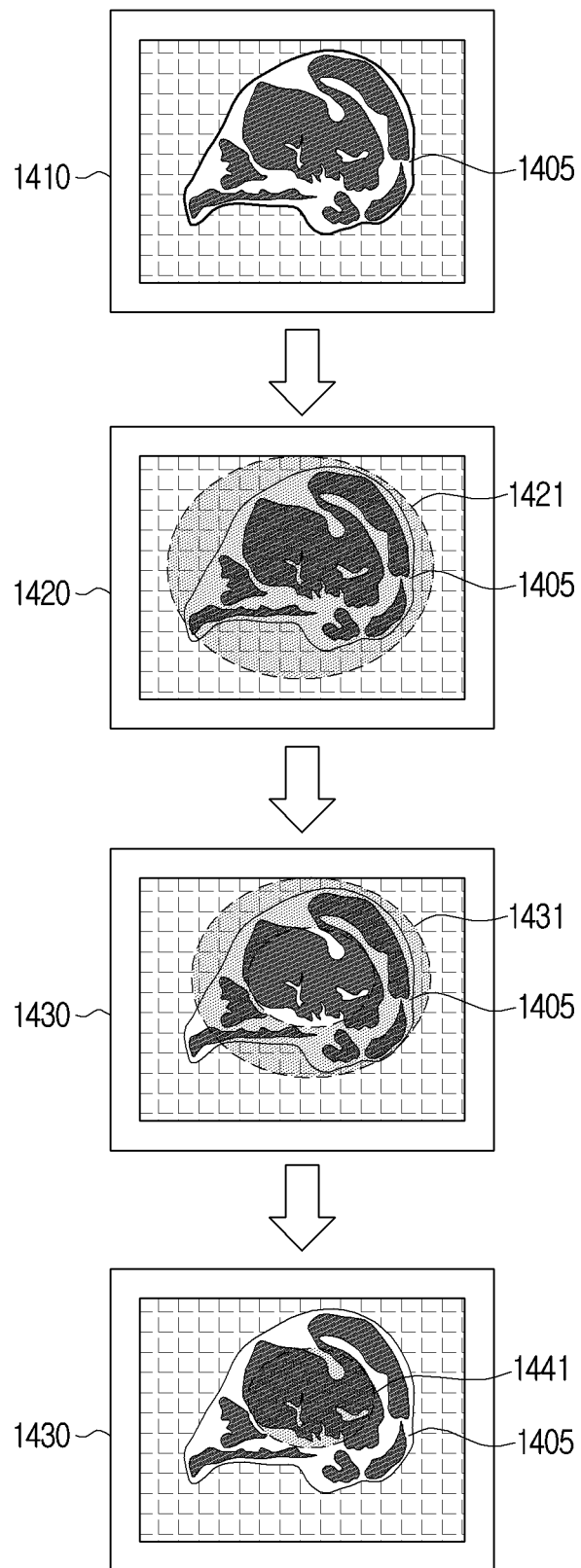
FIG. 14 is a diagram illustrating a preset area in the control operation of FIG. 13.

FIG. 14 is a diagram illustrating a preset area in the control operation of FIG. 13.

Referring to FIG. 14, the cooking apparatus 100 may obtain a first image 1410, a second image 1420, a third image 1430, and a fourth image 1440 according to the time sequence.

The cooking apparatus 100 may identify a food object 1405 in the first image 1410.

The cooking apparatus 100 may identify an object area (or target area) based on the food object 1405 identified in the first image 1410. The reason for identifying the target area is to reduce the data processing time by analyzing only the target area without analyzing all regions of the image.

The identified target area may be used to analyze the second image 1420. The cooking apparatus 100 may analyze the food object 1405 based on the target area 1421 in the second image 1420.

The target area may be changed based on the amount of change in the cooking state. The first target area may be the entire area of the food object in the second image 1420. In the early stage of cooking, there may be little change in the entire food. Accordingly, the cooking apparatus 100 may analyze all of the entire area of the food to identify whether there is a change in any portion.

If the food is meat, the cooking state of the food may be changed from the outside according to the cooking process. That is, since the meat starts ripening from the outside according to the cooking process, the amount of change in the cooking state of the outer portion may be increased. The cooking apparatus 100 may change a target area to an area having a high cooking state change amount in the entire area of the food. The cooking apparatus 100 may determine an outer area of the food as a new target area.

The changed target area may be used to analyze the third image 1430. The cooking apparatus 100 may analyze the food object 1405 based on the target area 1431 changed in the third image 1430.

In the cooking process, after the outer portion of the meat is all ripen, an inside portion may be ripening. The amount of change in the cooking state of the outer portion of the meat which has been already ripen may be reduced and the amount of change in the cooking state of the inner portion of the meat may be increased. The cooking apparatus 100 may re-change the target area. The cooking apparatus 100 may re-change the target area into a region having a high cooking state change.

The re-changed target area may be used to analyze the fourth image 1440. The cooking apparatus 100 may analyze the food object 1405 based on the target area 1441 re-changed in the fourth image 1440.

Figure 15:
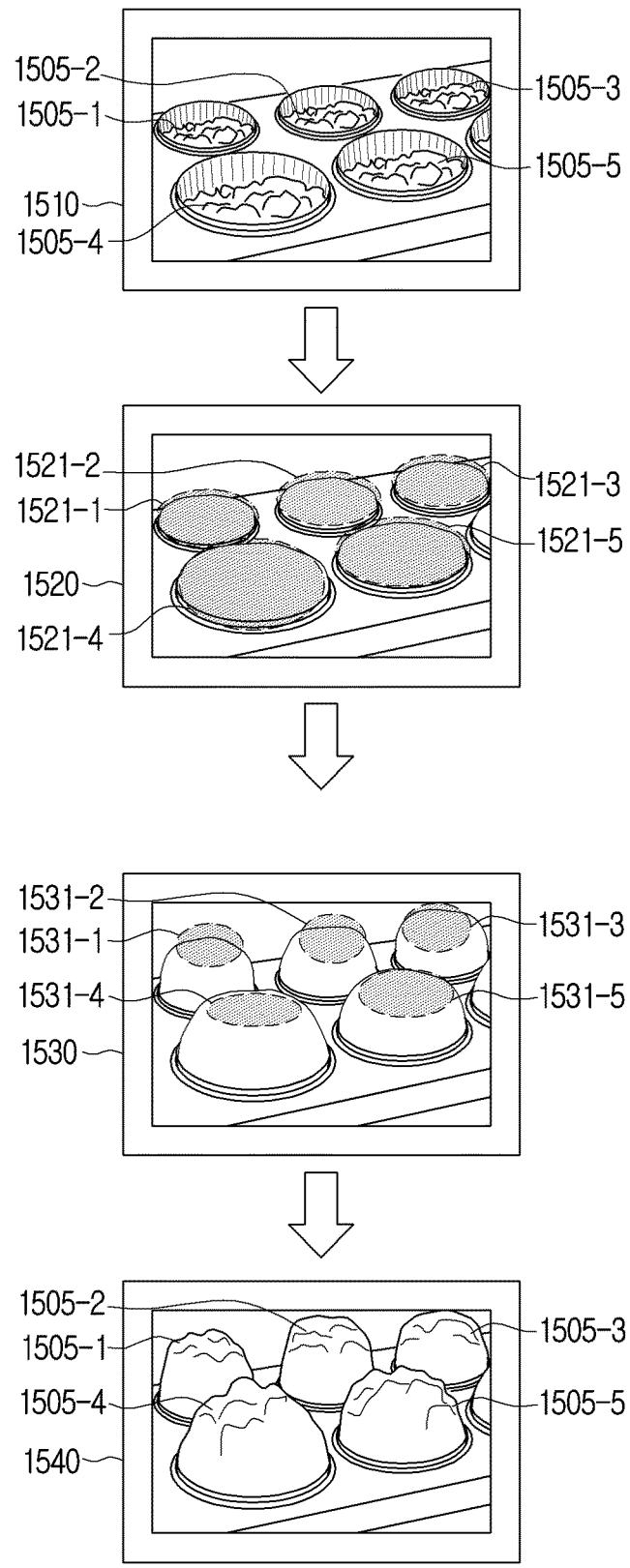
FIG. 15 is a diagram illustrating an analysis operation of a plurality of food objects in the control operation of FIG. 13.

FIG. 15 is a diagram illustrating an analysis operation of a plurality of food objects in the control operation of FIG. 13.

Referring to FIG. 15, the cooking apparatus 100 may cook a plurality of foods at the same time unlike FIG. 14. Accordingly, the food object may be a plurality of objects. The cooking apparatus 100 may obtain the first image 1510, the second image 1520, the third image 1530, and the fourth image 1540 according to the time sequence.

The cooking apparatus 100 may identify a plurality of food objects 1505-1, 1505-2, 1505-3, 1505-4, and 1505-5.

The cooking apparatus 100 may identify the target area based on the plurality of identified food objects 1505-1 to 1505-5. The cooking apparatus 100 may determine the entire area of the food corresponding to each of the food objects 1505-1 to 1505-5 as a target area. The cooking apparatus 100 may identify a plurality of target areas since the food objects 1505-1 to 1505-5 are in plural.

The identified plurality of target areas may be used to analyze the second image 1520. The cooking apparatus 100 may analyze the food objects 1505-1 to 1505-5 based on the plurality of target areas 1521-1, 1521-2, 1521-3, 1521-4, and 1521-5 in the second image 1520.

When the food is bread, the cooking state of the food may be changed from the inside according to the cooking process. The cooking apparatus 100 may change a target area to a region having a high cooking state change amount in the entire area of the food. The cooking apparatus 100 may determine an inner area of the food as a new target area.

The changed target area may be used to analyze the third image 1530. The cooking apparatus 100 may analyze the food objects 1505-1 to 1505-5 based on the changed target areas 1531-1, 1531-2, 1531-3, 1531-4, and 1531-5 changed in the third image 1530.

The cooking apparatus 100 may finally identify whether cooking of the food objects 1505-1 to 1505-5 is completed. If it is identified that there is no change in the cooking state of the food objects 1505-1 to 1505-5 based on the fourth image 1540, the cooking apparatus 100 may identify that the cooking has been completed.

Figure 16:
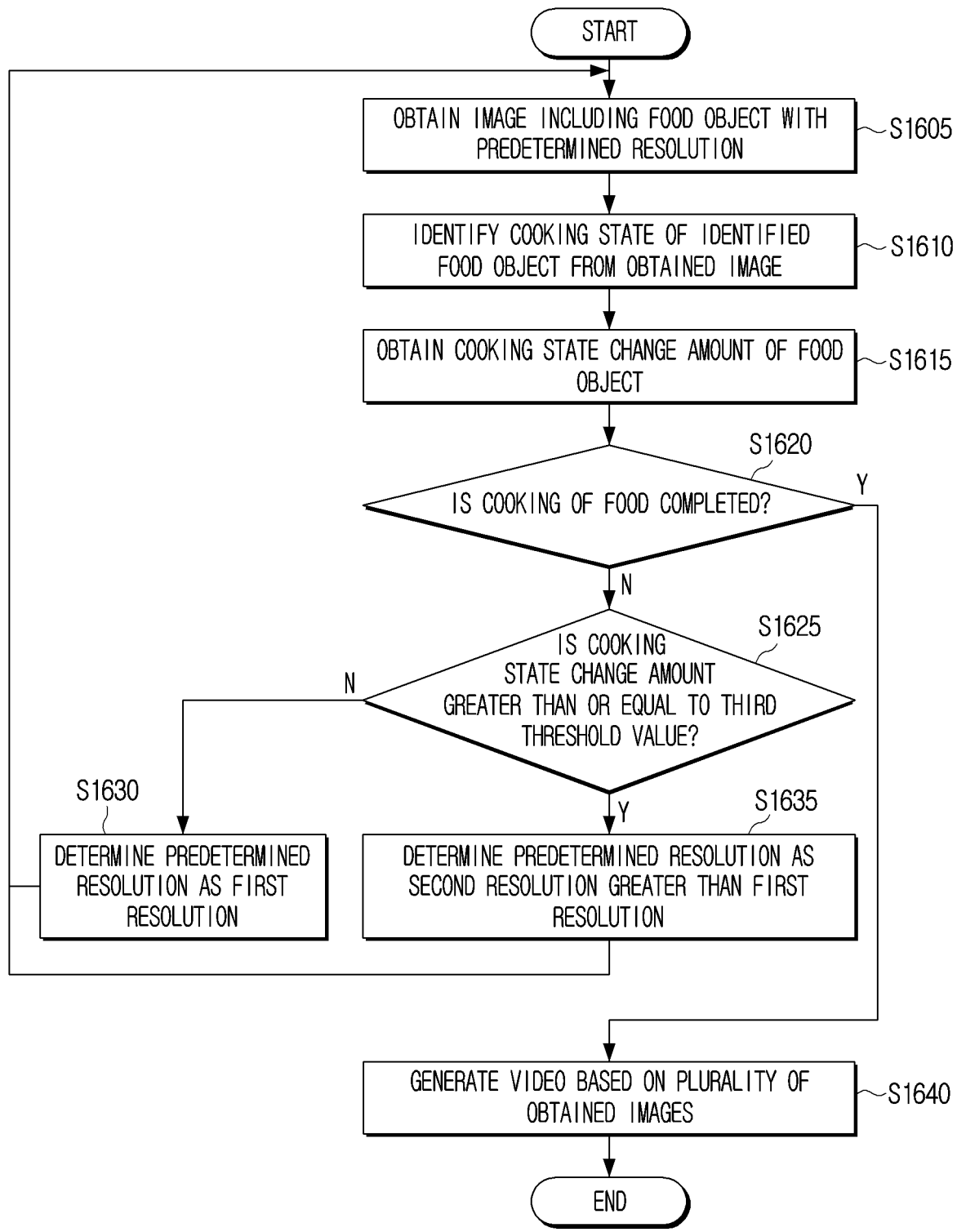
FIG. 16 is a flowchart illustrating an operation of controlling resolution.

FIG. 16 is a flowchart illustrating an operation of controlling resolution.

Referring to FIG. 16, the cooking apparatus 100 may obtain an image including the food object with a predetermined definition in operation S1605. The cooking apparatus 100 may identify the food object from the obtained image and may identify the cooking state of the identified food object in operation S1610. The cooking apparatus 100 may obtain a cooking state change amount of the food object in operation S1615. The cooking apparatus 100 may identify whether the cooking of the food is completed in operation S1620. Since operation S1620 may correspond to S720, a duplicate description will be omitted.

If it is identified that cooking of food is completed, the cooking apparatus 100 may generate a video based on the obtained plurality of images in operation S1650.

If it is identified that the cooking of the food is not completed, the cooking apparatus 100 may identify whether the cooking state change amount is greater than or equal to the fourth threshold value in operation S1625. If the amount of change in the cooking state is less than the fourth threshold value, the cooking apparatus 100 may determine the predetermined resolution as the first resolution in operation S1630. The cooking apparatus 100 may obtain an image based on the determined first resolution.

If the amount of change in the cooking state is equal to or greater than the fourth threshold value, the cooking apparatus 100 may determine the predetermined resolution in the second resolution in operation S1635. Here, the second resolution may be greater than the first resolution. The cooking apparatus 100 may obtain an image based on the determined second resolution.

The cooking apparatus 100 may identify the cooking state of the food object based on the predetermined resolution determined in accordance with operations S1630 and S1635 and repeat the operations S1605 to S1620. When the cooking of the food is identified as being completed, the cooking apparatus 100 may generate a video based on the plurality of obtained images in operation S1650.

If the cooking state change amount is high, the cooking apparatus 100 may analyze the food object by using an image with a higher quality by increasing resolution.

Figure 17:
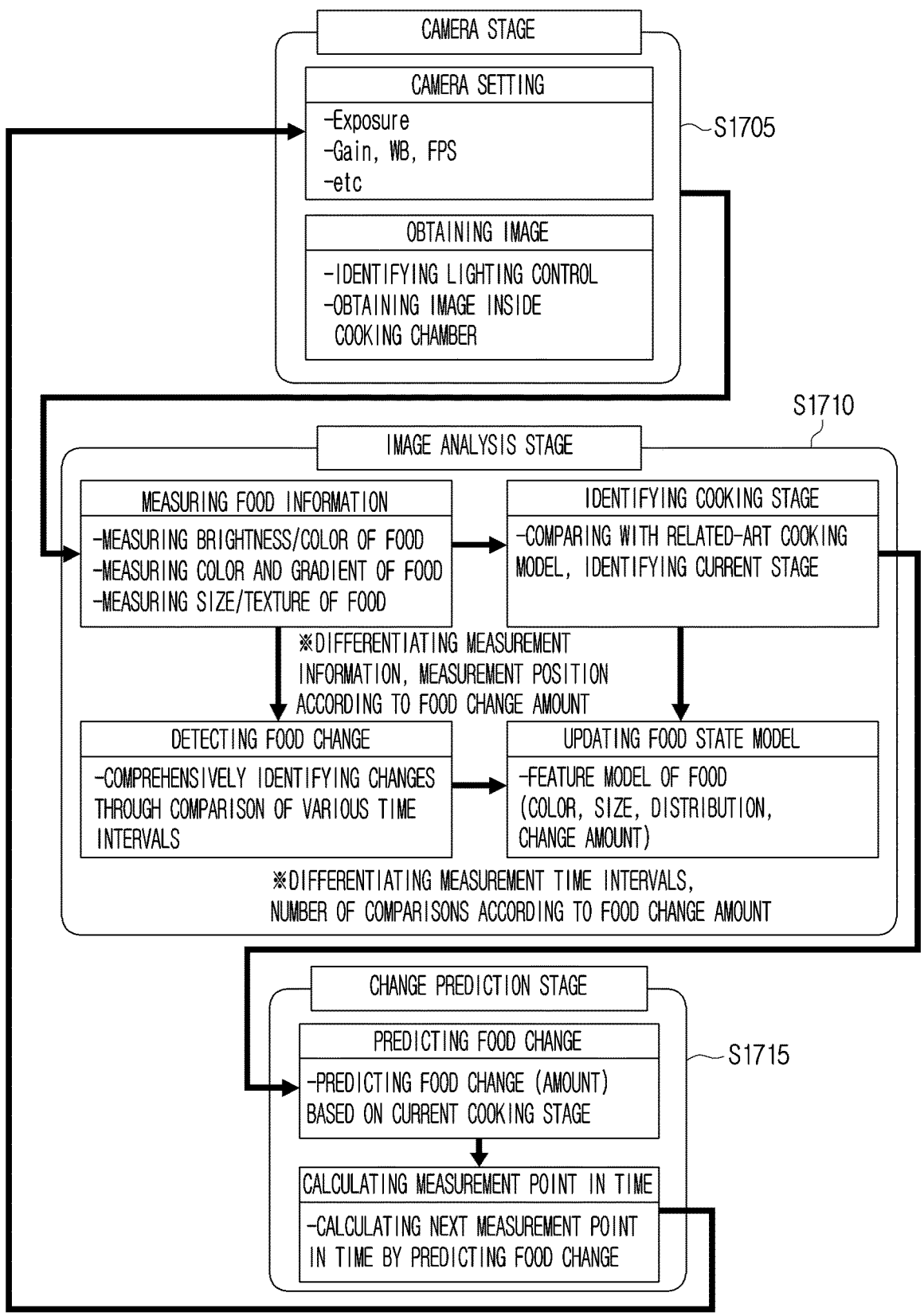
FIG. 17 is a diagram illustrating a process of estimating a cooking state of food.

FIG. 17 is a diagram illustrating a process of estimating a cooking state of food.

Referring to FIG. 17, the cooking apparatus 100 may obtain an image using the image capturer 110 in operation S1705. The cooking apparatus 100 may obtain an image by adjusting exposure, gain, white balance, frame per second (FPS), or the like, among settings associated with the image capturer 110 based on the amount of change in the cooking state. The cooking apparatus 100 may obtain an image inside the cooking chamber 20 using the image capturer 110.

The cooking apparatus 100 may analyze the image based on the obtained image in operation S1710. The cooking apparatus 100 may measure food object (food) information. The cooking apparatus 100 may measure at least one of brightness, color, gradient, size, or texture of the food. The cooking apparatus 100 may perform a measurement operation by changing the measurement information and the measurement position based on the amount of change of the food.

The cooking apparatus 100 may identify the change amount of the food (the change in the cooking state) through the comparison of time intervals. The cooking apparatus 100 may perform a change amount identification operation by changing at least one of the time intervals or the number of times of comparison based on the amount of change.

The cooking apparatus 100 may update a feature model of the food cooking state. The cooking apparatus 100 may identify a basic feature model of the food. The basic feature model may include feature information and may be identified based on at least one of color, size distribution, or change amount. The basic feature model may mean a feature model determined without considering the cooking state change amount. For example, a basic feature model may be identified by user selection while a predetermined feature model is stored in a memory. The cooking apparatus 100 may change a feature model of a cooking state of the food according to the cooking state of the food. For example, the cooking apparatus 100 may analyze the image based on the basic feature model and change the basic feature model to another feature model based on the cooking state change amount.

The cooking apparatus 100 may analyze the cooking state of the current food by comparing the existing feature model with the changed feature model.

The cooking apparatus 100 may predict a change in food as a result of the cooking state analysis operation. The cooking apparatus 100 may predict a change (or change amount) of the food on the basis of the current cooking step of the food.

The cooking apparatus 100 may predict a change in food and calculate a next measurement point in time. The cooking apparatus 100 may obtain an image based on the calculated next measurement point in time in operation S1705.

Figure 18:
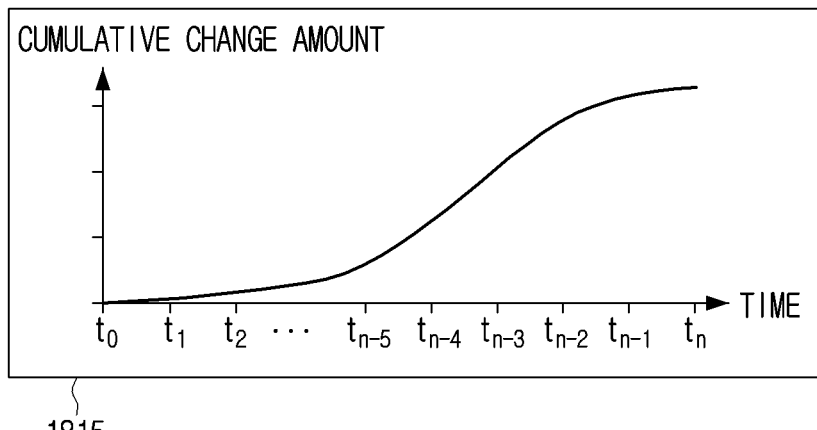
FIG. 18 is a diagram illustrating a cooking state cumulative change amount of food over time.

FIG. 18 is a diagram illustrating a cooking state cumulative change amount of food over time.

Referring to FIG. 18, equation 1805 may mean a calculation process for predicting a change amount in the next point in time.

$D\_n+1$ may refer to a change amount (cumulative) predicted at the next point in time.

$D\_n$ may refer to a change amount (cumulative) of cooking state measured at the current point in time.

$D\_step$ may mean a cooking state change amount (cumulative) based on the predetermined cooking step. $D\_step$ may mean a cooking state change amount (cumulative) corresponding to food already stored in a memory instead of information analyzed by using an image. For example, if the food is meat, information in accordance with a general cooking process of meat may be stored in the memory. The cooking apparatus 100 may identify which food is cooked by the user's selection. The cooking apparatus 100 may identify which food is to be cooked based on the image obtained before the start of cooking. The cooking apparatus may obtain a basic cooking state change amount (cumulative) corresponding to the identified food. The obtained basic cooking state change amount (cumulative) may mean cooking state change amount (cumulative) information over time. For example, the basic cooking change amount information may include information that the bread is changed from white to brown according to the cooking step.

$D\_pred$ may refer to the predicted cooking state change amount.

$D\_pred$ may mean a value obtained by summing $a\_x * \text{diff}(D_n, D_x)$ from a specific point in time $(n-m)$ to an immediate previous point in time $(n-1)$. Here, x may be a variable for a point in time. Here, m may mean a fixed constant and may refer to a value regarding up to what time, data will be reflected. For example, if 10 data are to be reflected, m may be 10 (m=10).

Here, $a\_x$ may mean a weight corresponding to an x point in time. The cooking apparatus 100 may adjust the weight so that a higher weight is applied as the cooking apparatus 100 is closer to the current point in time. The diff $(D_n, D_x)$ may be a difference value between a cooking state change amount (cumulative) of a current point in time (n) and a cooking state change amount (accumulation) of a specific point in time (x).

As a result, $D\_pred$ may be a value obtained by adding a difference value between a cooking state change amount (cumulative) of a current point in time (N) and a cooking state change (accumulation) of a specific point in time (x), for a recent m point in time.

The cooking apparatus 100 may obtain $D\_n+1$ by adding the calculated $D\_n$, $D\_step$, and $D\_pred$.

The Equation 1810 may mean a formula for determining a capture interval (or time interval). The capture interval may be calculated as $b/(D\_n+1)$. Here, b may be a constant or a weight. The user may set the value of b to be greater if desired to increase the capture interval than the calculated capture value according to the user setting, and may set the value of b to be smaller if desired to reduce the capture interval than the calculated capture interval. Here, D_n+1 may mean a predicted cooking state change amount (cumulative) at the next point in time calculated in Equation 1805.

The graph 1815 may mean the cumulative change amount of the cooking state according to the point in time. The current point in time may be t_n. Since the change amount is cumulative change, the gradient of the graph 1815 may be a change in the cooking state at a particular point of time. Referring to the graph 1815, the amount of change in the cooking state may be low at the initial point in time t_0, t_1, t_2. If the time elapses, the amount of change in the cooking state may be increased at the time t_n–5. If a predetermined time elapses, the amount of change in the cooking state may be decreased again from the time t_n–2. Since there is little change in food in the initial cooking step, and there is little change in food in the final cooking completion step, the cooking apparatus 100 may obtain data similar to the graph 1815.

Figure 19:
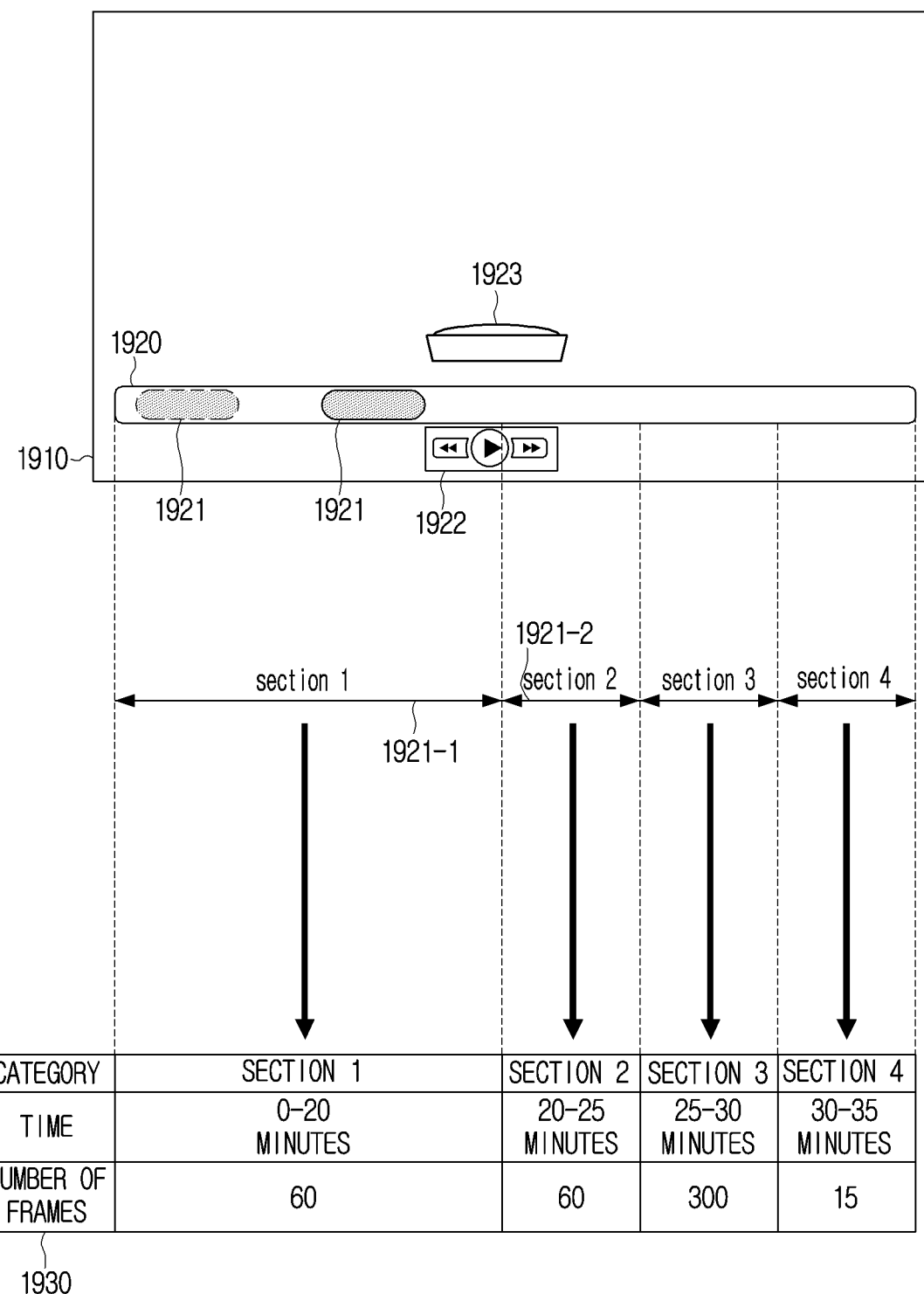
FIG. 19 is a diagram illustrating a UI displayed while a video is reproduced.

FIG. 19 is a diagram illustrating a UI displayed while a video is reproduced.

Referring to FIG. 19, the cooking apparatus 100 may generate a video including a time slide UI 1920 representing a time flow. The time slide UI 1920 may be included in one 1910 of the video. The time slide UI 1920 may include a current location UI 1921 to indicate the point in time at which the currently reproduced image is located. The current location UI 1921 may be moved to the right according to video reproduction. One image 1910 of the video may include a UI 1922 related to reproduction, which is for reproducing the current video from a previous point in time or from a next point in time, or pausing (or reproducing) the current video. A change in food 1923 may be displayed according to video reproduction.

In general, a time slide UI 1920 may have the same number of frames corresponding to a predetermined interval. However, the cooking apparatus 100 may generate a video such that a different number of frames exist in a predetermined interval.

It is assumed that the entire cooking process is 35 minutes and is divided into four sections. Referring to table 605, it is assumed that the first section is 20 minutes and there is little change in the cooking state, and the capture interval is 20 seconds. The cooking apparatus 100 may obtain 60 frames (images) based on the 20 second capture interval for 20 minutes.

It is assumed that the second section is five minutes and the amount of change in the cooking state is increased, and the capture interval is five seconds. The cooking apparatus 100 may obtain 60 frames (images) using a five second capture interval for five minutes.

It is assumed that the third section is five minutes and the amount of change in the cooking state is further increased so that the capture interval is one second. The cooking apparatus 100 may obtain 300 frames (images) using the one second capture interval for five minutes.

It is assumed that the fourth section is five minutes and the amount of change in the cooking state is reduced so that the capture interval is 20 seconds. The cooking apparatus 100 may obtain 15 frames (images) using a 20 second capture interval for five minutes.

The cooking apparatus 100 may adjust the number of frames based on the amount of change in the cooking state without allocating the same frame according to the reproduction time.

The first section is 20 minutes and the second section is five minutes but the number of frames may be equal to 60, since the second section is more important than the first section. The cooking apparatus 100 may allocate more frames to a desired section. The cooking apparatus 100 may generate a summarized video.

In order to intuitively inform the user of the distorted time information in the summary process, the cooking apparatus 100 may use a time slide UI 1920. Although the first section and the second section are the same as 60 frames, the time slide UI corresponding to respective sections may be displayed in different sizes. For example, the time slide UI corresponding to the first section may be displayed as a first size 1921-1, and the time slide UI corresponding to the second section may be displayed as a second size 1921-2 smaller than the first size 1921-1. The size of the time slide UI corresponding to respective sections may be proportional to the reproduction time information prior to editing.

The current position UI 1921 may be displayed as if the cooking state change amount moves relatively quickly in the section with low cooking state change amount, and may be displayed as if the amount of change in the cooking state moves relatively slowly in the section with high cooking state change amount.

Figure 20:
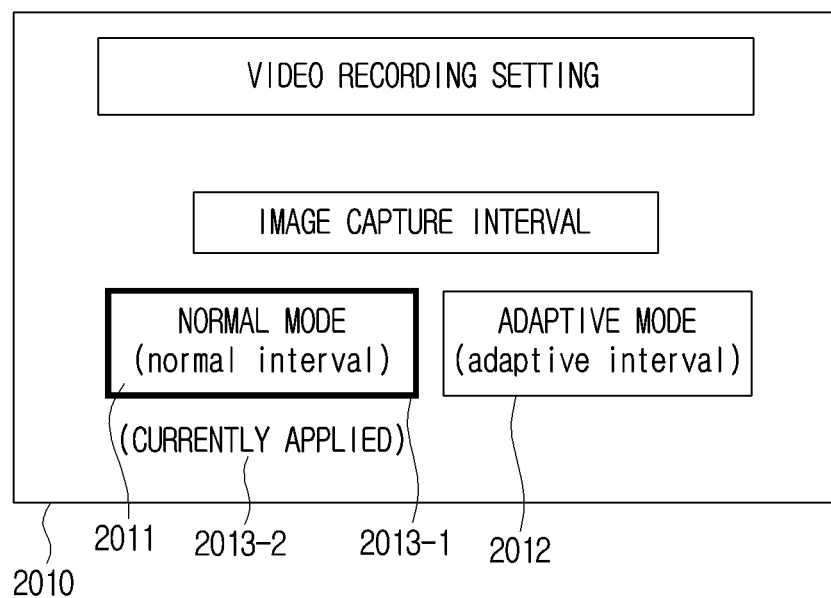
FIG. 20 is a diagram illustrating a video recording setting UI according to an embodiment.

FIG. 20 is a diagram illustrating a video recording setting UI according to an embodiment.

Referring to FIG. 20, the cooking apparatus 100 may display a video recording setting UI. The cooking apparatus 100 may display a screen 2010 for adjusting the image capture interval on the display 130. The screen 2010 for adjusting the image capture interval may include a UI that includes a mode name. For example, the screen 2010 for adjusting the image capture interval may include a UI 2012 corresponding to a normal interval that controls the capture interval to a predetermined value, or a UI 2012 corresponding to an adaptive interval in which the image capture interval is changed.

In order to increase the convenience of a user, the cooking apparatus 100 may provide a notification for a currently set mode. Specifically, the cooking apparatus 100 may additionally display a UI 2013-1 for emphasizing the currently set mode. The cooking apparatus 100 may additionally display text information 2013-2 indicating a currently set mode. Each UI 2011 and 2012 may be a UI that allows a user to select a capture interval.

Figure 21:
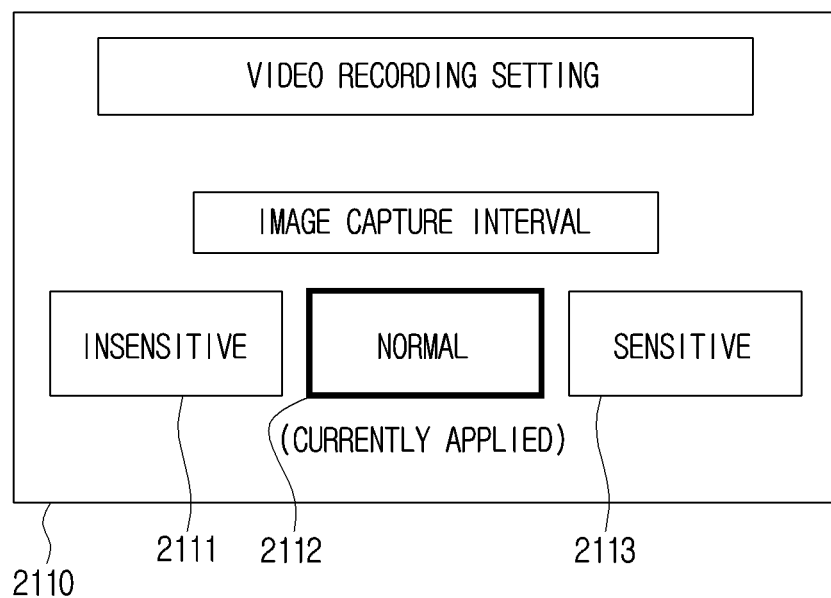
FIG. 21 is a diagram illustrating a video recording setting UI according to another embodiment.

FIG. 21 is a diagram illustrating a video recording setting UI according to another embodiment.

Referring to FIG. 21, the cooking apparatus 100 may display a screen 2110 for adjusting an image capture interval on the display 130. The screen 2110 for adjusting the image capture interval may display a UI indicating the degree of adjustment of the capture interval. For example, the cooking apparatus 100 may display a UI 2111 corresponding to "insensitive", a UI 2112 corresponding to "general", and a UI 2113 corresponding to "sensitive." Respective UIs 2111, 2112, and 2113 may be a UI that guides the user to select a capture interval.

Figure 22:
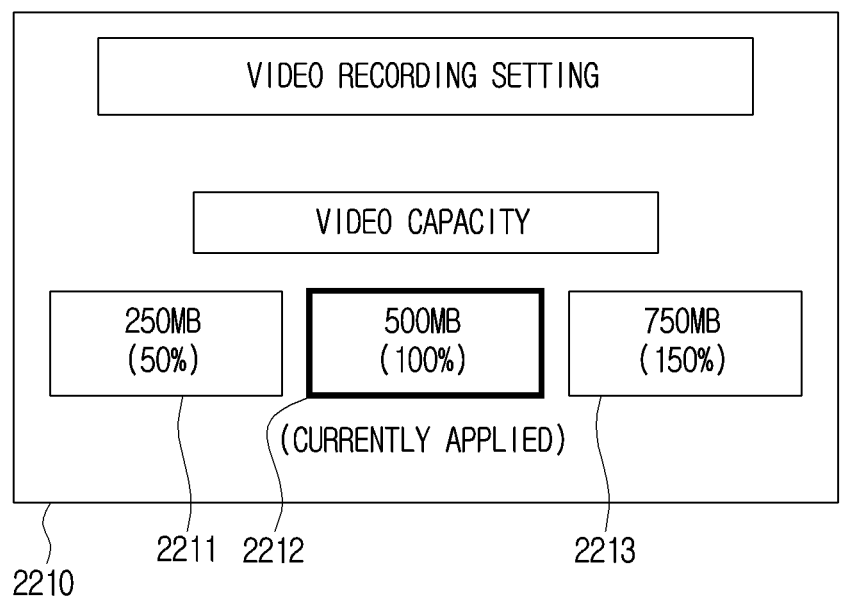
FIG. 22 is a diagram illustrating a video recording setting UI according to still another embodiment.

FIG. 22 is a diagram illustrating a video recording setting UI according to still another embodiment.

Referring to FIG. 22, the cooking apparatus 100 may display a screen 2210 for guiding to select a video capacity on the display 130. The screen 2210, which guides the video capacity to be selected, may include at least one UI corresponding to the size information of the finally generated video. For example, the cooking apparatus 100 may display the UI 2211 corresponding to "250 MB", a UI 2212 corresponding to "500 MB", and a UI 2213 corresponding to "750 MB". The cooking apparatus 100 may additionally display size change information (50%, 100%, 150%) in order to inform at which degree the video size is changed based on the reference size 500 MB along with the information indicating the size of the video. Respective UIs 2211, 2212, and 2213 may be a UI that guides the user to select the video size that is finally generated.

Figure 23:
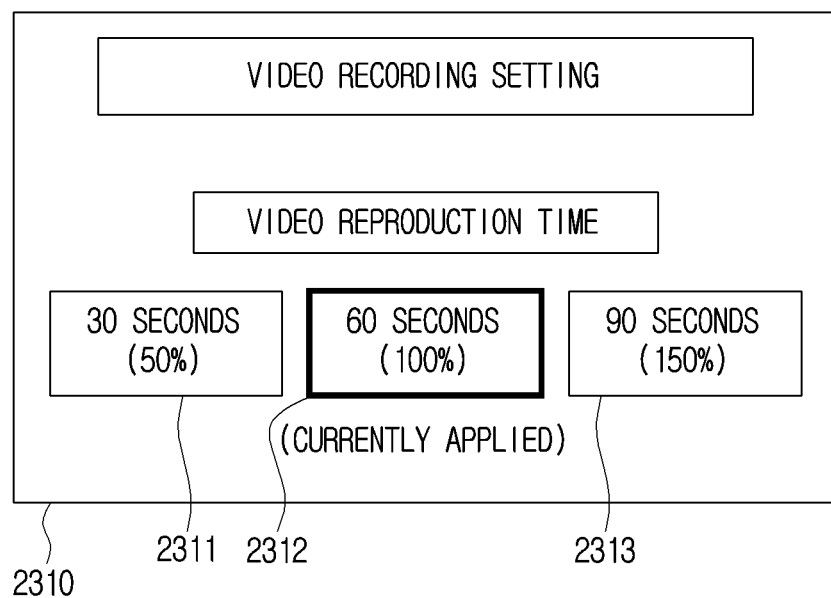
FIG. 23 is a diagram illustrating a video recording setting user interface (UI) according to still another embodiment.

FIG. 23 is a diagram illustrating a video recording setting user interface (UI) according to still another embodiment.

Referring to FIG. 23, the cooking apparatus 100 may display a screen 2310, which guides to select a video reproduction time, on the display 130. The screen 2310, which guides the video reproduction time to be selected, may include at least one UI corresponding to the time information of the finally generated video. For example, the cooking apparatus 100 may display a UI 2311 corresponding to "30 seconds", a UI 2312 corresponding to "60 seconds", and a UI 2313 corresponding to "90 seconds". The cooking apparatus 100 may additionally display reproduction time change information (50%, 100%, and 150%) to indicate at which degree video reproduction time is changed on the basis of the reference reproduction time (60 seconds) along with the information indicating the video reproduction time. Respective UIs 2311, 2312, and 2313 may be a UI that guides the user to select a video reproduction time that is finally generated.

Figure 24:
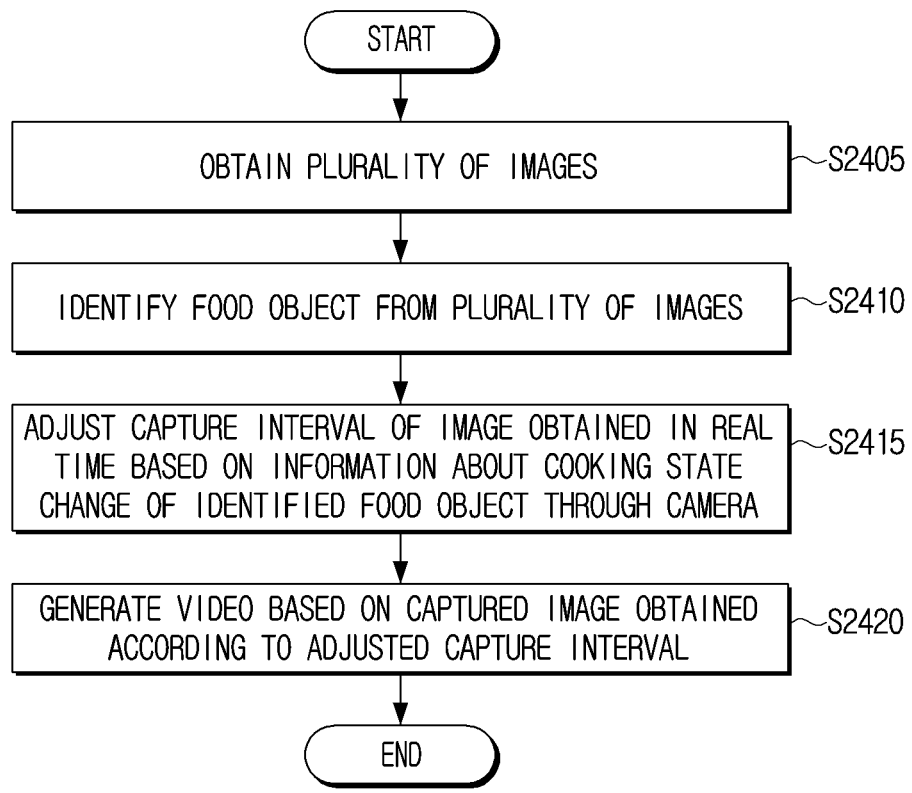
FIG. 24 is a flowchart illustrating a controlling method of a cooking apparatus according to an embodiment.

FIG. 24 is a flowchart illustrating a controlling method of a cooking apparatus according to an embodiment Referring to FIG. 24, the controlling method of the cooking apparatus 100 includes obtaining a plurality of images in operation S2405, identifying a food object from a plurality of obtained images in operation S2410, adjusting a capture interval at which an image of the food object is obtained in real time based on information about a cooking state change of the identified food object in operation S2415 and generating a video based on the captured image obtained according to the adjusted capture interval in operation S2420.

The cooking state change information may include a cooking state change amount, and the adjusting the capture interval may include adjusting the capture interval to be inverse-proportional with the cooking state change amount of the food object.

The adjusting the capture interval in operation S2415 may include, based on the cooking state change amount of the food object being less than a first threshold value, increasing the capture interval, and based on the cooking state change amount of the food object being greater than or equal to a second threshold value, decreasing the capture interval.

The method may further include analyzing the food object using at least one feature information from the plurality of obtained images and adjusting the number of the at least one feature information to be proportional with the cooking state change amount of the food object.

The feature information may include at least one of a contour, an edge, a corner, a histogram, or brightness, and the controlling method of the cooking apparatus 100 may further include extracting the feature information from the plurality of obtained images, and obtaining the food object and the cooking state change information of the food object based on the extracted feature information.

The method for controlling the cooking apparatus 100 may further include the steps of identifying, as a target area, an area where the amount of change in the cooking state of the food object obtained from the plurality of obtained images is greater than or equal to a third threshold value and obtaining a cooking state change amount of the food object identified on the basis of the identified target area.

The controlling method of the cooking apparatus 100 may further include, based on the cooking state change amount of the food object being greater than or equal to a fourth threshold value, changing a resolution of the obtained image.

The controlling method of the cooking apparatus 100 may further include obtaining a predicted cooking state change amount of the food object based on the cooking state change amount included in the stored food information and the cooking state change information of the food object, and changing the capture interval of the image capturer based on the predicted cooking state change amount of the food object.

The controlling method of the cooking apparatus 100 may further include obtaining the cooking state change amount of the identified food object based on at least one of a size change amount (or a size state change amount) of the food object and a color change amount (or a color state change amount) of the food object, and adjusting the capture interval of the image based on the obtained cooking state change amount.

The controlling method of the cooking apparatus 100 may further include displaying a guide user interface (UI) for changing the capture interval.

The method of the electronic apparatus, as shown in FIG. 24, may be executed on a cooking apparatus having the configuration of FIG. 1 or FIG. 2, and may be executed on a cooking apparatus having other configurations.

Methods according to the embodiments as described above may be implemented as an application executable in an existing cooking apparatus (electronic apparatus).

Methods according to the embodiments as described above may be implemented as software or hardware of a cooking apparatus (electronic apparatus).

Embodiments described above may be performed through an embedded server provided in a cooking apparatus (electronic apparatus), or an external server of at least one of a cooking apparatus (electronic apparatus) or a display apparatus.

Embodiments may be implemented in software, including instructions stored on machine-readable storage media readable by a machine (e.g., a computer). An apparatus may read instructions from the storage medium, and execute the instruction, including a cooking apparatus (electronic apparatus). When the instructions are executed by a processor, the processor may perform a function corresponding to the instructions directly or by utilizing other components under the control of the processor. The instructions may include computer-readable codes generated by a compiler or a code executable by an interpreter. A machine-readable storage medium may be provided in the form of a non-transitory storage medium, which expression denotes that a storage medium is tangible, and does not distinguish the case in which a data is semi-permanently stored in a storage medium from the case in which a data is temporarily stored in a storage medium.

The methods according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, components (e.g., module or program) may be combined to form a single entity. In this configuration, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

While the disclosure has been particularly shown and described with reference to certain embodiments thereof, it will be understood by those skilled in the art that various changes in form and details may be made therein without departing from the scope of the subject matter as defined by the appended claims and their equivalents.

The invention claimed is:

1. A cooking apparatus comprising:
   an image capturer;
   and a processor configured to: identify a food object from a plurality of images obtained through the image capturer, adjust a capture interval at which an image of the food object is obtained in real time through the image capturer whereby the capture interval is adjusted based on information about a cooking state change of the identified food object obtained from the plurality of images, and generate a video based on at least one image captured by the image capturer according to the adjusted capture interval.

2. The cooking apparatus of claim 1, wherein the information about the cooking state change comprises a cooking state change amount, and
   wherein the processor is further configured to adjust the capture interval to be inverse-proportional with the cooking state change amount of the food object.

3. The cooking apparatus of claim 2, wherein the processor is further configured to:
   based on the cooking state change amount of the food object being less than a first threshold value, increase the capture interval of the image capturer, and
   based on the cooking state change amount of the food object being greater than or equal to a second threshold value, decrease the capture interval of the image capturer.

4. The cooking apparatus of claim 2, wherein the processor is further configured to:
   analyze the food object using at least one feature information from the plurality of images obtained, and
   adjust a number of the at least one feature information to be proportional with the cooking state change amount of the food object.

5. The cooking apparatus of claim 4, wherein the at least one feature information comprises at least one of a contour, an edge, a corner, a histogram, or brightness, and
   wherein the processor is further configured to extract the at least one feature information from the plurality of images obtained, and obtain the food object and the information about the cooking state change of the food object based on the extracted at least one feature information.

6. The cooking apparatus of claim 2, wherein the processor is further configured to:
   identify an area of which the cooking state change amount of the food object is greater than or equal to a third threshold value from the plurality of images obtained as a target area, and
   obtain the cooking state change amount of the identified food object based on the identified target area.

7. The cooking apparatus of claim 2, wherein the processor is further configured to, based on the cooking state change amount of the food object being greater than or equal to a fourth threshold value, change a resolution of the image obtained from the image capturer.

8. The cooking apparatus of claim 2, further comprising:
   a memory configured to store food information corresponding to each of a plurality of foods,
   wherein the processor is further configured to:
      obtain a predicted cooking state change amount of the food object based on the cooking state change amount included in the stored food information and the information about the cooking state change of the food object, and
      change the capture interval of the image capturer based on the predicted cooking state change amount of the food object.

9. The cooking apparatus of claim 2, wherein the processor is further configured to: obtain the cooking state change amount of the identified food object based on at least one of a size change amount of the food object and a color change amount of the food object, and adjust the capture interval of the at least one image based on the obtained cooking state change amount.

10. The cooking apparatus of claim 1, further comprising:
    a display,
    wherein the display is controlled to display a guide user interface (UI) for changing the capture interval.

11. A controlling method of a cooking apparatus, the method comprising: obtaining a plurality of images; identifying a food object from the plurality of images obtained; adjusting a capture interval at which an image of the food object is obtained in real time whereby the capture interval is adjusted based on information about a cooking state change of the identified food object obtained from the plurality of images; and generating a video based on at least one image captured according to the adjusted capture interval.

12. The controlling method of claim 11, wherein the information about the cooking state change comprises a cooking state change amount, and,
    wherein the adjusting the capture interval comprises adjusting the capture interval to be inverse-proportional with the cooking state change amount of the food object.

13. The controlling method of claim 12, wherein the adjusting the capture interval comprises:
    based on the cooking state change amount of the food object being less than a first threshold value, increasing the capture interval, and
    based on the cooking state change amount of the food object being greater than or equal to a second threshold value, decreasing the capture interval.

14. The controlling method of claim 12, further comprising:
    analyzing the food object using at least one feature information from the plurality of images obtained; and adjusting a number of the at least one feature information to be proportional with the cooking state change amount of the food object.

15. The controlling method of claim 14, wherein the at least one feature information comprises at least one of a contour, an edge, a corner, a histogram, or brightness, and wherein the method further comprises extracting the at least one feature information from the plurality of images obtained, and obtaining the food object and the information about the cooking state change of the food object based on the extracted at least one feature information.

\* \* \* \* \*